(12) United States Patent
Kamo et al.

(10) Patent No.: US 8,348,473 B2
(45) Date of Patent: Jan. 8, 2013

(54) ILLUMINATION OPTICAL SYSTEM

(75) Inventors: Yuji Kamo, Hino (JP); Hideyasu Takato, Hino (JP); Tsutomu Sasamoto, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/199,733

(22) Filed: Sep. 7, 2011

(65) Prior Publication Data

US 2012/0134159 A1    May 31, 2012

Related U.S. Application Data

(63) Continuation of application No. PCT/JP2010/069512, filed on Nov. 2, 2010.

(30) Foreign Application Priority Data

Nov. 16, 2009  (JP) .................................. 2009-261088

(51) Int. Cl.
  *F21V 5/04*  (2006.01)
  *F21V 7/00*  (2006.01)
(52) U.S. Cl. ........ 362/308; 362/309; 362/327; 362/337; 362/339; 362/335
(58) Field of Classification Search .................. 362/308, 362/309, 326, 327, 337, 335, 339
See application file for complete search history.

(56) References Cited

U.S. PATENT DOCUMENTS

| | | | |
|---|---|---|---|
| 2,818,500 A * | 12/1957 | Franck .......................... | 362/337 |
| 4,684,224 A | 8/1987 | Yamashita et al. | |
| 5,912,764 A | 6/1999 | Togino | |
| 6,373,645 B1 * | 4/2002 | Kamo ........................... | 359/834 |
| 7,605,983 B2 | 10/2009 | Yokoyama | |
| 7,699,473 B2 | 4/2010 | Mukawa et al. | |

FOREIGN PATENT DOCUMENTS

| | | |
|---|---|---|
| JP | 50-149170 | 11/1975 |
| JP | 59-087403 | 5/1984 |
| JP | 04-105634 | 4/1992 |

(Continued)

OTHER PUBLICATIONS

Japanese Office Action, dated Mar. 6, 2012, issued in corresponding Japanese Patent Application No. 2011-538475.

*Primary Examiner* — Stephen F Husar
*Assistant Examiner* — James Cranson, Jr.
(74) *Attorney, Agent, or Firm* — Kenyon & Kenyon LLP

(57) ABSTRACT

An illumination optical system includes a prism disposed on an incident optical axis and a lens that is disposed between the light source and an incident surface of the prism or between an emitting surface of the prism and an illuminated object, at least one of the reflection surfaces being a transmission/reflection surface. Additionally, an illumination optical system includes a prism having a surface that is disposed so as to obliquely intersect with an incident optical system, that transmits a part of the entering light to be emitted therefrom, and that deflects at least part of the rest of the light in a direction that intersects with the incident optical axis to be emitted therefrom. Furthermore, an illumination optical system has a rod lens that is disposed so that a longitudinal direction thereof is inclined with respect to an incident optical axis is provided.

3 Claims, 16 Drawing Sheets

FOREIGN PATENT DOCUMENTS

| | | |
|---|---|---|
| JP | 04-142506 | 5/1992 |
| JP | 06-034889 | 2/1994 |
| JP | 06-138400 | 5/1994 |
| JP | 08-160320 | 6/1996 |
| JP | 08-286044 | 11/1996 |
| JP | 10-090603 | 4/1998 |
| JP | 11-125773 | 5/1999 |
| JP | 2000-193894 | 7/2000 |
| JP | 2002-233494 | 8/2002 |
| JP | 2005-250408 | 9/2005 |
| JP | 3791899 | 4/2006 |
| JP | 2009-015180 | 1/2009 |
| JP | 2009-092966 | 4/2009 |
| JP | 2009-217167 | 9/2009 |

\* cited by examiner

ILLUMINATION OPTICAL SYSTEM

CROSS-REFERENCE TO RELATED APPLICATIONS

This is a continuation of International Application PCT/JP2010/069512, with an international filing date of Nov. 2, 2010, which is hereby incorporated by reference herein in its entirety. This application claims the benefit of Japanese Patent Application No. 2009-261088, the content of which is incorporated herein by reference.

TECHNICAL FIELD

The present invention relates to an illumination optical system and, in particular, to an illumination optical system that is suitable for an endoscope.

BACKGROUND ART

Endoscopes are apparatuses that are widely used in the medical field and the industrial field. Particularly in the medical field, endoscopes are utilized in the diagnosis of observed sites by acquiring images inside body cavities. There are folds and ridges inside body cavities, often resulting in complex shapes.

A conceivable method is to increase the angular field of an objective lens of an endoscope, thereby widening the observation area laterally and rearward. Doing so facilitates observation of a large area inside a lumen. At this time, it is also necessary to expand an illumination area laterally simultaneously with the expansion of the angular field to illuminate a sufficient region of the observation area. Known methods of illuminating laterally include a method in which a light guide is bent (for example, see Patent Literature 1) and a method of deflecting illumination light with a reflection member (for example, see Patent Literatures 2, 3, and 4).

CITATION LIST

Patent Literature

{PTL 1} Publication of Japanese Patent No. 3791899.
{PTL 2} Japanese Unexamined Patent Application, Publication No. Hei 8-286044.
{PTL 3} Japanese Unexamined Patent Application, Publication No. Hei 6-138400.
{PTL 4} Japanese Unexamined Patent Application, Publication No. Hei 6-34889.

SUMMARY OF INVENTION

Technical Problem

With the method in Patent Literature 1, the size of the light guide is increased in a radial direction at a bent portion thereof. Furthermore, a bend angle inevitably needs to be increased to perform illumination with a wide angular field.

With Patent Literature 2, lateral illumination is performed using a prism. The specific configuration of the optical system is not described. In addition, because the light distribution is not taken into consideration, it is not known whether or not it can be employed in observation with an appropriate lateral illumination.

In Patent Literature 3, an illumination optical system in which the light distribution is taken into consideration with the optical power of an optical device is disclosed. Since this illumination optical system is designed for a lateral-viewing endoscope, an endoscope equipped with this can illuminate laterally in one direction. In addition, a reflection surface of the optical device is large.

With Patent Literature 4, a size reduction is achieved by sharing an optical path of an illumination system with an image-capturing lens. A half mirror needs to be disposed in the optical path of the image-capturing lens system. In addition, the light distribution is dependent on the configuration of the image-capturing lens.

The present invention is to provide an illumination optical system that can illuminate laterally, that is suitable for an observation optical system having a wide angular field, and that is compact and has excellent light distribution properties.

Solution to Problem

A first aspect of the present invention is an illumination optical system including a prism that is disposed on an incident optical axis of light from a light source and a lens that is disposed between the light source and an incident surface of the prism or between an emitting surface of the prism and an illuminated object, wherein the prism has two reflection surfaces, and at least one of the reflection surfaces is a transmission/reflection surface that serves for reflection and transmission.

In the first aspect described above, the prism and at least one lens may be arranged in this order from a side closer to the light source, and a beam from the light source may be passed the prism through a transmission surface, the transmission/reflection surface, the reflection surface, and the transmission/reflection surface in this order.

In the first aspect described above, the lens may be a positive lens and may be disposed at the stage before the prism.

A second aspect of the present invention is an illumination optical system including a prism that has a surface which is disposed so as to obliquely intersect with an incident optical axis of light from a light source, which transmits part of the light that has entered along the incident optical axis to be emitted therefrom, and which deflects at least part of the rest of the light in a direction that intersects with the incident optical axis, wherein the prism has a substantially columnar shape whose center axis is disposed along the direction of the incident optical axis, and an end surface thereof disposed at an opposite side from the light source is formed at an angle with respect to the center axis.

A third aspect of the present invention is an illumination optical system including a prism that has a surface which is disposed so as to obliquely intersect with an incident optical axis of light from a light source, which transmits part of the light that has entered along the incident optical axis to be emitted therefrom, and which deflects at least part of the rest of the light in a direction that intersects with the incident optical axis, wherein a frustum-like tapered rod prism is provided at a stage before the prism and is disposed along the incident optical axis.

A forth aspect of the present invention is an illumination optical system including a rod lens that is disposed so that a longitudinal direction thereof is inc the d-line with respect to an incident optical axis from a light source.

In the forth aspect of the present invention is an end surface of the rod lens closer to the light source may be formed at an angle with respect to the longitudinal direction thereof.

In the forth aspect described above, a light guide that is disposed between the light source and the rod lens and that guides light from the light source to the rod lens may be provided, wherein the light guide has a distal end surface formed at an angle with respect to an optical axis thereof.

DESCRIPTION OF EMBODIMENTS

A first embodiment of the present invention will be described below with reference to FIGS. 1 and 2.

Figure 1:
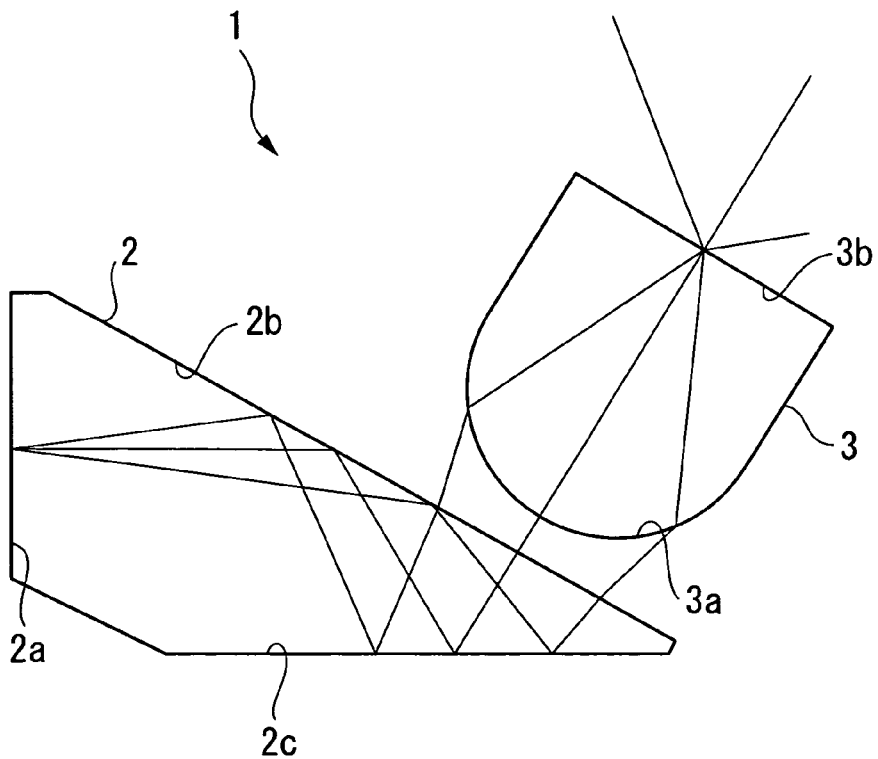
FIG. 1 is an overall configuration diagram of an illumination optical system according to a first embodiment of the present invention.

As shown in FIG. 1, an illumination optical system 1 according to the first embodiment of the present invention is provided with a prism 2 disposed on a light source side and a lens 3 disposed outside of an emitting surface of the prism 2.

The prism 2 has an incident surface (transmission surface) 2a that faces toward a light source and that is disposed so as to perpendicularly intersect with an incident optical axis from the light source, a transmission/reflection surface 2b that intersects with the incident optical axis at an angle, and a reflection surface 2c that faces the transmission/reflection surface 2b. The transmission/reflection surface 2b is configured to reflect light that enters from the incident surface 2a along the incident optical axis toward the reflection surface 2c, to transmit the light through a portion thereof so that the light reflected at the reflection surface 2c is transmitted, and to reflect the light at other portions thereof.

The reflection surface 2c is disposed so that an angle θ formed between a normal thereof and a line of the transmission/reflection surface 2b satisfies $20°≦θ≦45°$, or, more preferably, disposed so as to satisfy $10°≦θ≦30°$. At this time, if θ exceeds 45°, the size of the prism 2 becomes large, and, additionally, light rays that do not satisfy the conditions for total reflection also increase, which is not preferable because of a worse light distribution. On the other hand, if θ is less than 20°, the aperture becomes large because the area of the transmission/reflection surface 2b increases, and size reduction becomes difficult, which is not preferable.

In addition, the refractive index of the prism 2 with respect to the d-line satisfies $1.6≦n≦2.2$ or, more preferably, satisfies $1.65≦n≦2.0$. Since the optical distance from the light source to the emitting surface is increased by disposing the prism 2 in the optical path, light tends to escape to the side surfaces of the lens 3, etc. In order to prevent this, it is desirable to configure the prism 2 with a somewhat high refractive index to shorten the equivalent length in air. If the refractive index n exceeds 2.2, the cost of a glass material increases, and, in addition, transmittance of a blue color decreases and the color of the illumination changes, which is not preferable. On the other hand, if the refractive index is less than 1.6, light that escapes to the side surfaces of the lens 3 increases and the illumination efficiency decreases, which is not preferable.

A positive lens having a positive focal length or a negative lens having a negative focal length is employed as the lens 3. The lens 3 in FIG. 1 is a positive lens in which a surface on a light source side is spherical and a surface on an object side is flat.

In the case of a positive lens, a shape factor SF1 of the lens 3 satisfies $0.5 \leq SF1 \leq 1.25$, or, more preferably, satisfies $0.8 \leq SF1 \leq 1.05$. Here, SF1 is $(R1+R2)/(R1-R2)$, where R1 is the radius of curvature of an object side surface 3b of the lens 3 and R2 is the radius of curvature of a light-source side surface 3a of the lens 3.

If SF1 exceeds 1.25, the curvature of the lens 3 on the light-source side becomes too large, making processing of the lens 3 difficult, or the curvature of the object side surface 3b causes divergence and an effective light distribution cannot be achieved, which is not preferable. On the other hand, if SF1 is less than 0.5, an effective light distribution cannot be achieved because the curvature on the light-source side surface 3a becomes too mild. Alternatively, the diameter of the lens 3 increases, and, as a result, the curvature of the object side surface 3b becomes too large and light-distribution properties in the vicinity thereof deteriorate, which is not preferable.

On the other hand, when the lens 3 is a negative lens, a shape factor SF2 thereof satisfies $0.6 \leq SF2 \leq 1.25$, or, more preferably, satisfies $0.7 \leq SF2 \leq 1.05$. Here, SF2 is $(R1+R2)/(R1-R2)$, where R1 is the radius of curvature of the object side surface 3b of the lens 3, and R2 is the radius of curvature of the light-source side surface 3a of the lens 3.

If SF2 exceeds 1.05, the curvature of the light-source side surface 3a becomes too large, making processing of the lens 3 difficult, or the curvature of the object side surface 3b causes convergence and an effective light distribution cannot be achieved, which is not preferable. On the other hand, if SF2 is less than 0.7, an effective light distribution cannot be achieved because the curvature on the light-source side surface 3a becomes too mild, or the curvature of the object side surface 3b becomes too large and light-distribution properties in the vicinity thereof deteriorate, which is not preferable.

The operation of the thus-configured illumination optical system 1 will be described with an example of a case in which it is employed in an endoscope.

The illumination optical system 1 according to this embodiment is installed at the distal end of an endoscope. The illumination optical system 1 is disposed by connecting the incident surface 2a of the prism 2 to an illumination apparatus provided in the endoscope, for example, the distal end surface of a light guide, which is connected to a light source and disposed along a longitudinal direction in an inserted portion of the endoscope. At this time, the illumination optical system 1 of this embodiment is used together with another light guide disposed in the inserted portion and an illumination optical system that illuminates the area in front of the inserted portion.

In this way, with this embodiment, light from the light source is emitted laterally with respect to the front side of the inserted portion, and not only forward illumination but also lateral illumination are satisfactorily provided with respect to the insertion direction of the endoscope. Therefore, an advantage is afforded in that, even if the endoscope has a large angular field, a satisfactory region of this wide field of view can be illuminated. In addition, an advantage is afforded in that light distribution can be appropriately controlled by appropriately designing the optical properties by employing the lens 3.

Furthermore, there is an advantage in that, by configuring one surface of the prism 2 as the transmission/reflection surface 2b that serves both for transmission and reflection, the shape of the prism 2 can be simplified, and light from the light source can be deflected laterally with respect to the incident optical axis while keeping the size of the prism 2 small. In addition, by disposing the lens 3 in a space created outside the transmission/reflection surface 2b of the prism 2, the size of the illumination optical system 1 can be kept small. Since the diameter at the distal end can be made small, while also providing lateral illumination, this is favorable particularly in an endoscope. Furthermore, with the lens 3 disposed on an incident side or an emitting side of the prism 2, light distribution properties of the light emitted from the prism 2 can be enhanced.

Figure 2:
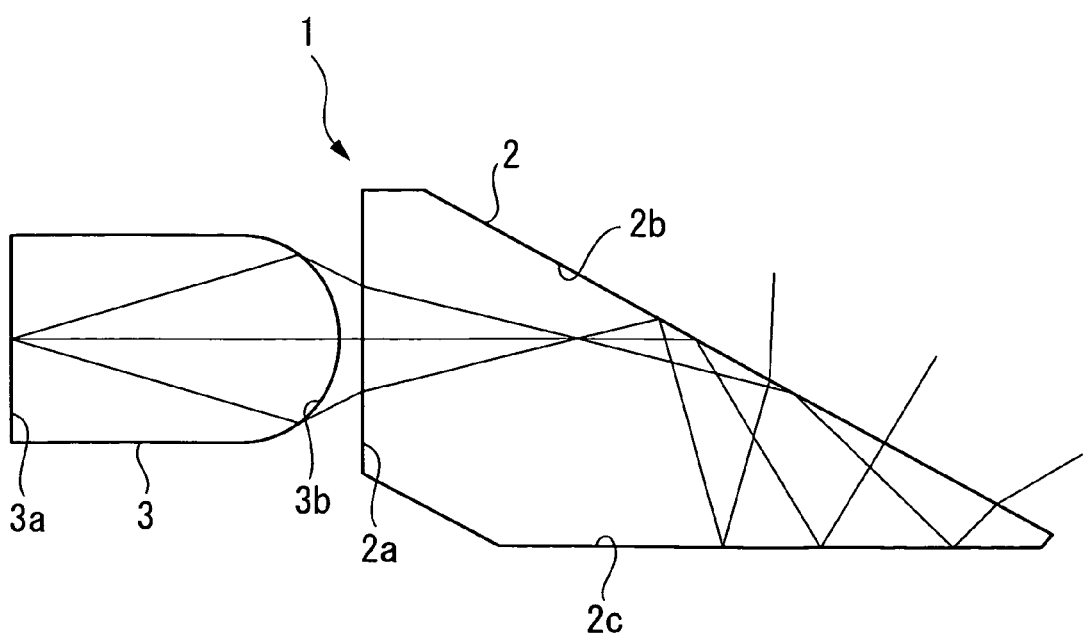
FIG. 2 is a diagram showing a modification of the illumination optical system in FIG. 1.

Although the lens 3 is disposed at a stage after the prism 2 in the above-described embodiment, alternatively, the lens 3 may be disposed at a stage before the prism 2, as shown in FIG. 2.

In this case, the lens 3 is preferably a positive lens. By doing so, light from the light source can temporarily be converged with the lens 3, and the light can be prevented from escaping to the side surfaces of the prism 2.

In addition, a shape factor SF3 of the lens 3 in this case is preferably $-1.2 \leq SF3 \leq 0.2$, or, more preferably, $-1.05 \leq SF3 \leq 0$. Here, SF3 is $(R1+R2)/(R1-R2)$, where R1 is the radius of curvature of the object side surface 3b of the lens 3, and R2 is the radius of curvature of the light-source side surface 3a of the lens 3. By doing so, the light distribution can be more appropriately controlled.

If SF3 exceeds 0.2, the curvature of the light-source side surface 3a of the positive lens 3 becomes too large and the amount of light that escapes increases, or the curvature of the object side surface 3b becomes too mild and an appropriate light distribution cannot be achieved, which is not preferable. On the other hand, if SF3 is less than −1.05, the curvature of the light-source side surface 3a of the positive lens 3 causes divergence and the prism 2 becomes large, or the curvature of the object side surface 3b becomes too large and processing of the lens 3 becomes difficult, which is not preferable.

In addition, in the above-described embodiment, a plurality of the illumination optical systems 1 may be provided and the individual illumination optical systems 1 may illuminate different directions.

For example, emitting directions of the individual illumination optical systems 1 are directed outward in radial directions, and the plurality of illumination optical systems 1 are arranged at the distal end of the endoscope in a circumferential direction thereof. Accordingly, illumination can be evenly provided in the circumferential direction when, for example, illuminating a wall surface of a circular cylinder.

In addition, in the above-described embodiment, the prism 2 may exhibit reflection effects at the side surfaces thereof. As a method of imparting reflection effects to the side surfaces of the prism 2, a method in which mirror coatings are applied to the side surfaces of the prism 2 is desirable.

By disposing the prism 2 in the optical path, the optical distance from the light source to the transmission reflection surface 2b, from which light is emitted, increases, and the amount of light that escapes to the side surfaces of the lens 3 increases. Therefore, it is desirable to impart reflection effects to these side surfaces so that light does not escape from the side surfaces except for the incident surface 2a and a portion of the transmission/reflection surface 2b. By doing so, the light can be efficiently utilized, and the illumination efficiency can be enhanced.

In addition, in the above-described embodiment, the prism 2 may exhibit diffusing effects, causing light diffusion in the side surfaces thereof.

In a case where light strikes the side surfaces of the prism 2, because the direction of reflection is determined by the direction of the normals of the side surfaces thereof, light distributions at interfaces between the optical surface and the side surfaces tend to be variable. Therefore, by imparting diffusing effects to the side surfaces of the prism 2, the variability in the light distributions can be decreased. In this case, to impart diffusing effects to the side surfaces, it is desirable to apply roughening to the side surfaces.

In addition, as another method of diffusing light at the side surfaces of the prism 2, a member exhibiting a diffusing effect may be disposed at an object side of the prism 2. By doing so, the same effect as imparting diffusing effects to the emitting surface of the prism 2 can also be obtained. In this case, by changing the diffusing properties of a member exhibiting diffusing effects, fine control of the light distribution becomes possible.

Additionally, in the above-described embodiment, the prism 2 may have the reflection effect at the portion of the transmission/reflection surface 2b.

Sometimes part of the light emitted from the transmission/reflection surface 2b does not pass through the lens 3 disposed on the object side of the prism 2. Therefore, by imparting reflection effects to the portion of the transmission/reflection surface 2b to return the light that does not enter the lens 3 into the prism 2, the light can be effectively utilized.

Next, an illumination optical system 1 according to a second embodiment of the present invention will be described with reference to FIGS. 3 to 6.

Figure 3:
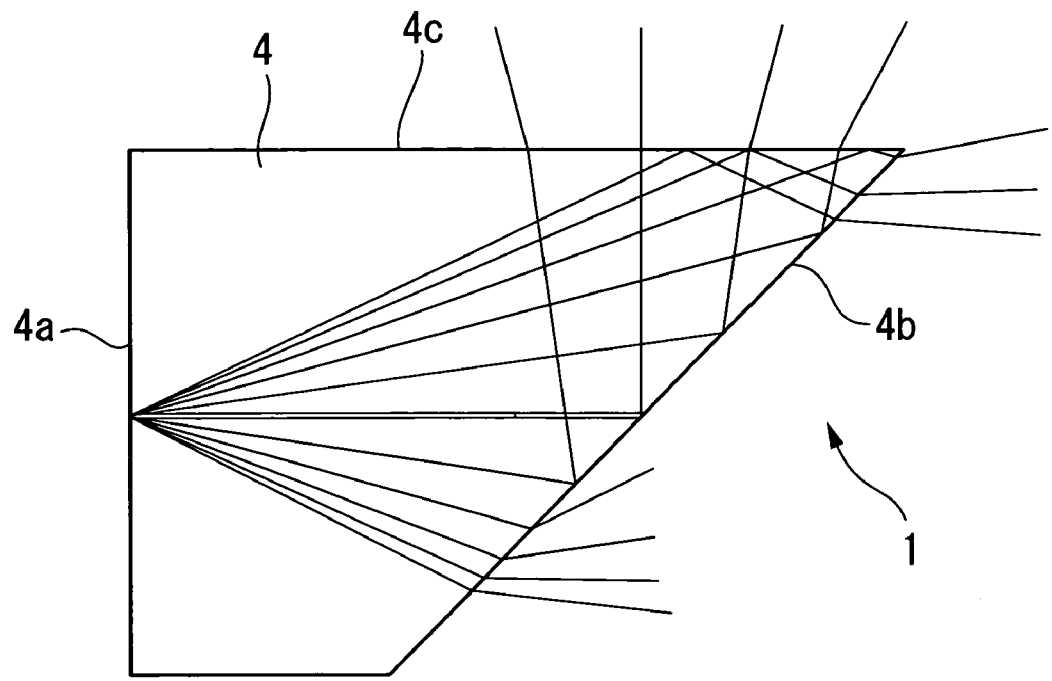
FIG. 3 is an overall configuration diagram of an illumination optical system according to a second embodiment of the present invention.

As shown in FIG. 3, the illumination optical system 1 according to this embodiment is provided with a prism 4 having a substantially columnar shape. The prism 4 is formed such that one end surface 4a is perpendicular to a center axis thereof, and the other end surface (surface) 4b is inclined with respect to the center axis thereof.

The prism 4 is disposed so that one end surface (hereinafter, referred to as an incident surface) 4a perpendicularly intersects, at substantially the center thereof, an optical incident axis of the light source. The other end surface (hereinafter, referred to as an inclined surface 4b) 4b transmits light that is made incident at an incident angle that is equal to or less than a predetermined angle and reflects light that is made incident at an incident angle that is larger than the predetermined angle. Light reflected at the inclined surface 4b passes through a side surface 4c. Accordingly, the prism 4 emits the light from the light source by distributing it forward and laterally with respect to the incident optical axis.

An angle θp formed between a center axis of the prism 4 and the inclined surface 4b satisfies 20°≦θp≦70°, or, more preferably, satisfies 35°≦θp≦60°. The distribution of light between transmission and reflection at the inclined surface 4b depends on an angle relative to the center axis thereof. If θp exceeds 70°, the amount of reflected light becomes too small, and, if θp is less than 20°, the amount of transmitted light becomes too small; therefore, the balance between forward and lateral light distribution is disrupted, which is not preferable.

In addition, the refractive index np of the prism 4 satisfies 1.61≦np≦2.2, or, more preferably, satisfies 1.7≦np≦2.0. The distribution of light between transmission and reflection at a surface of the prism 4 also depends on the refractive index of the prism 4. Accordingly, reflected light and transmitted light at the inclined surface 4b of the prism 4 can appropriately be distributed. If np exceeds 2.2, problems arise in that the distribution of the reflected light becomes too large, the cost of the glass material increases, the transmittance of blue color decreases, changing the color of illumination light, etc., which is not preferable. On the other hand, if np is less than 1.6, the distribution for the reflected light becomes too small, which is not preferable.

The operation of the thus-configured illumination optical system 1 will be described with an example of a case in which it is employed in an endoscope.

The illumination optical system 1 according to this embodiment is, as with the first embodiment, disposed in the distal end of an inserted portion of an endoscope. Light guided by a light guide from a light source enters the prism 4, part of which is subsequently reflected at the inclined surface 4b and illuminates laterally, and at least part of the rest illuminates forward by passing through the inclined surface 4b. Accordingly, an advantage is afforded in that, even if the angular field of the endoscope is large, a satisfactorily wide area in the field of view can be illuminated by distributing light to a wide area including forwards and laterally.

In addition, in the case where light is bent laterally or rearward by simply employing a prism, forward illumination cannot be provided solely by doing so; therefore, it is necessary to separately form an illumination optical system for illuminating forward. Accordingly, the number of constituent members increases, which is disadvantageous in terms of size reduction. However, with this embodiment, because forward and lateral illumination is provided by employing the single prism 4, an advantage is afforded in that the size of the illumination optical system 1 can be reduced, and manufacturing costs can be reduced.

In addition, by employing the columnar prism 4 having curvature at the side surface 4c thereof, light reflected at the side surface 4c is distributed in radiating directions. As opposed to this, simply disposing a prism is disadvantageous in terms of light distribution, for example, in the case where the reflection surface is formed as a flat surface, spreading of light in the radiating directions is reduced, forming side surfaces as flat surfaces, as in a triangular prism, causes variability in light distribution, and so on. In this way, with this embodiment, an advantage is afforded in that, despite its simple configuration, variability in the light distribution can be reduced, the light distribution properties can be further enhanced, and the light distribution can be effectively controlled in radiating directions.

Figure 4:
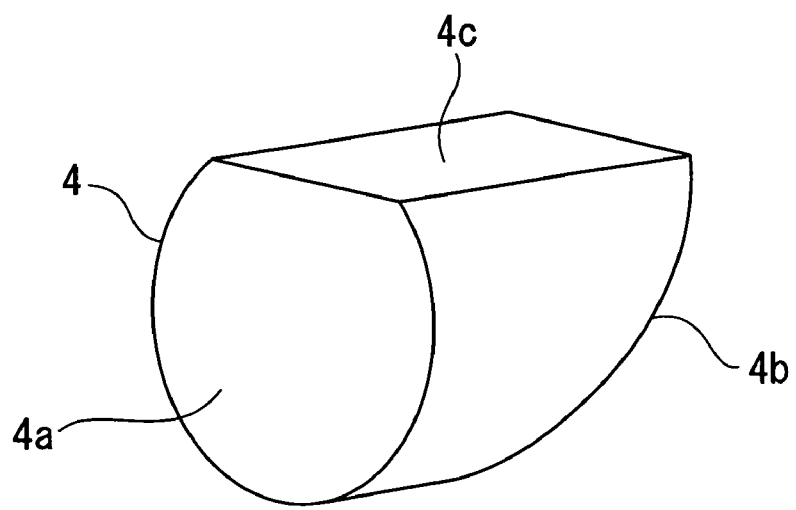
FIG. 4 is a diagram showing a modification of a prism in the illumination optical system in FIG. 3.

In the above-described embodiment, a portion of the side surface 4c of the prism 4 may be formed as a flat surface. For example, as shown in FIG. 4, the side surface 4c on one side of the prism 4 may be formed as a flat surface and light may be emitted from the flat surface.

Figure 5:
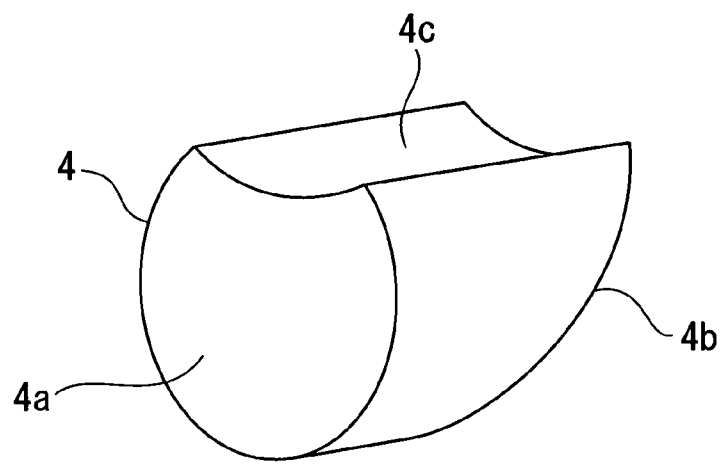
FIG. 5 is a diagram showing another modification of the prism in the illumination optical system in FIG. 3.

In addition, in the above-described embodiment, a portion of the side surface 4c of the prism 4 may have a different curvature from other parts thereof. For example, as shown in FIG. 5, the side surface 4c on one side of the prism 4 is formed as a cylindrically shaped concave surface. At this time, the shape of the portion having a different curvature from other parts may be a convex surface, a rotationally symmetrical curved surface, or an aspherical surface. By doing so, the properties of the light distribution can be finely controlled.

Additionally, in the above-described embodiment, the side surface 4c at a position from which light reflected at the inclined surface 4b is emitted may have a different optical property. In particular, by forming the emitting position of the light as a flat surface, the prism 4 is less likely to shatter due to an impact, which is preferable.

Figure 6:
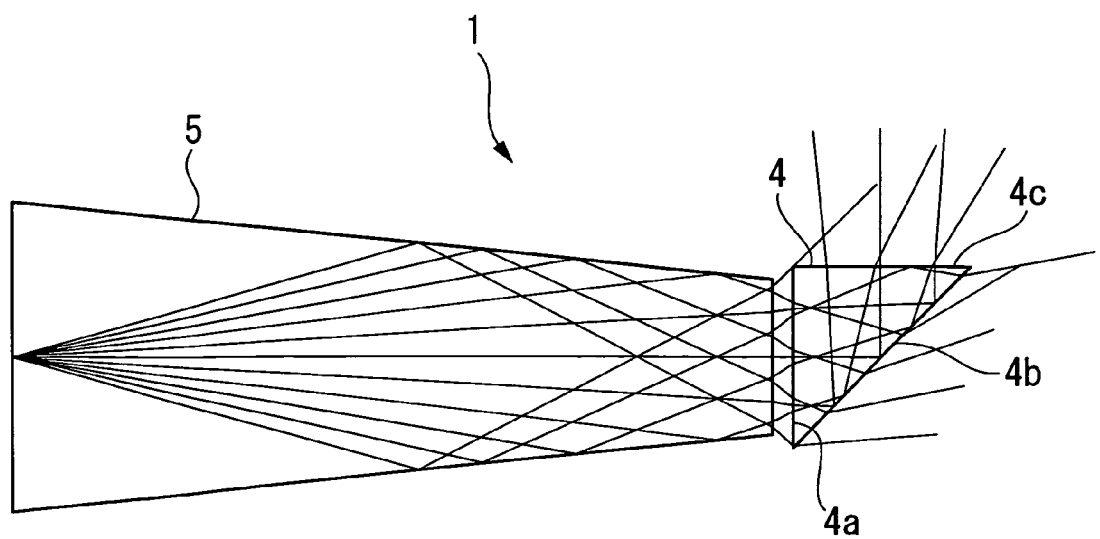
FIG. 6 is a diagram showing a modification of the illumination optical system in FIG. 3.

Furthermore, although the illumination optical system 1 is provided with one prism 4 in the above-described embodiment, a tapered rod prism 5 may be provided in the stage before the prism 4, as shown in FIG. 6. The tapered rod prism 5 is a frustum-shaped prism whose diameter gradually increases in one direction and has a circular or polygonal lateral cross-sectional shape. The tapered rod prism 5 is disposed so that a center axis thereof and the incident optical axis from the light source coincide with each other. Since the light distribution properties of the illumination optical system 1 are changed considerably by the tapered rod prism 5, it is desirable to appropriately set the configuration of the tapered rod prism 5.

The refractive index nt of the tapered rod prism 5 preferably satisfies $1.4 \leq nt \leq 1.8$, or, more preferably, satisfies $1.4 \leq nt \leq 1.7$. In a case where the tapered rod prism 5 has a clad structure in which refractive indices differ between the center portion thereof and the peripheral portion thereof, it is desirable to make the refractive index at the center portion somewhat small. If the refractive index nt exceeds 1.8, the cost of the glass material increases, or the transmittance decreases, thus decreasing the quantity of light, which is not preferable. On the other hand, if nt is less than 1.4, a sufficient refraction effect cannot be obtained, and the angle for light distribution between forward and lateral directions becomes too small, which is not preferable.

In addition, the length Lt of the tapered rod prism 5 preferably satisfies $1.0 \leq Din/Lt \leq 6.0$, or, more preferably, satisfies $1.2 \leq Din/Lt \leq 4.5$. Here, Lt is the length of the tapered rod prism 5 in the longitudinal direction, and Din is a maximum diameter or a maximum diagonal length of the incident surface or the emitting surface. Accordingly, the size of the illumination optical system 1 can be reduced, and the light distribution properties thereof can also be appropriately controlled. If Lt exceeds 6.0, the tapered rod prism 5 becomes too long, and it becomes difficult to reduce the size thereof; if Lt is less than 1.0, the tapered rod prism 5 becomes too short, and an appropriate light distribution cannot be obtained, which is not preferable.

By disposing the tapered rod prism 5 in the stage before the prism 4 in this way, the light distribution properties can be more appropriately controlled. In addition, in the case where the light distribution is controlled by imparting curvature to the prism surfaces, the size thereof is increased in order to ensure the configuration length and the thickness at edges; however, an advantage is afforded by employing the tapered rod prism 5 in that light distribution control can be realized without increasing the size in the radial direction with respect to the incident optical axis.

In this case, the tapered rod prism 5 may become gradually smaller in the emitting direction relative to the incident surface, or may become gradually larger.

In order to enhance the brightness at peripheral portions of an image, the tapered rod prism 5 is preferably made gradually smaller in the emitting direction. In this case, an incident area Sin and an emitting area Sout thereof preferably satisfy $0.025 \leq Sout/Sin \leq 1.0$, or, more preferably, satisfy $0.1 \leq Sout/Sin \leq 0.65$. By doing so, the brightness at the peripheral portions can be enhanced. If Sout/Sin exceeds 1.0, the angle for light distribution between forward and lateral directions becomes too small, which is not preferable. On the other hand, if Sout/Sin is less than 0.025, the light distribution spreads more than necessary, or the tip of the tapered rod prism 5 becomes too small and the strength thereof is weakened, which is not preferable.

On the other hand, in order to enhance the brightness at a center portion of the image, the tapered rod prism 5 is preferably made gradually larger in the emitting direction. In that case, $0.025 \leq Sin/Sout \leq 1.0$ is preferably satisfied, or, more preferably, $0.05 \leq Sin/Sout \leq 0.7$ is satisfied. Accordingly, the brightness at the center portion can be enhanced. If Sin/Sout exceeds 1.0, the light distribution becomes wider than necessary, or size reduction becomes difficult, which is not preferable. On the other hand, if Sin/Sout is less than 0.025, the angle for light distribution between forward and lateral directions become too small, which is not preferable.

In addition, the incident surface and the emitting surface in the tapered rod prism 5 may have different shapes.

When using the tapered rod prism 5, it is desirable to reduce a loss in the quantity of light. Specifically, the shape of the incident surface of the tapered rod prism should match the emitting shape from the light source, and the shape of the emitting surface thereof should match the incident shape in the prism 4. Accordingly, light can be efficiently utilized, and, simultaneously, because the incident area and the emitting area do not have to be unnecessarily increased, the size becomes smaller, and thus, a size reduction can also be achieved.

Next, an illumination optical system 1 according to a third embodiment of the present invention will be described with reference to FIGS. 7 and 8.

Figure 7:
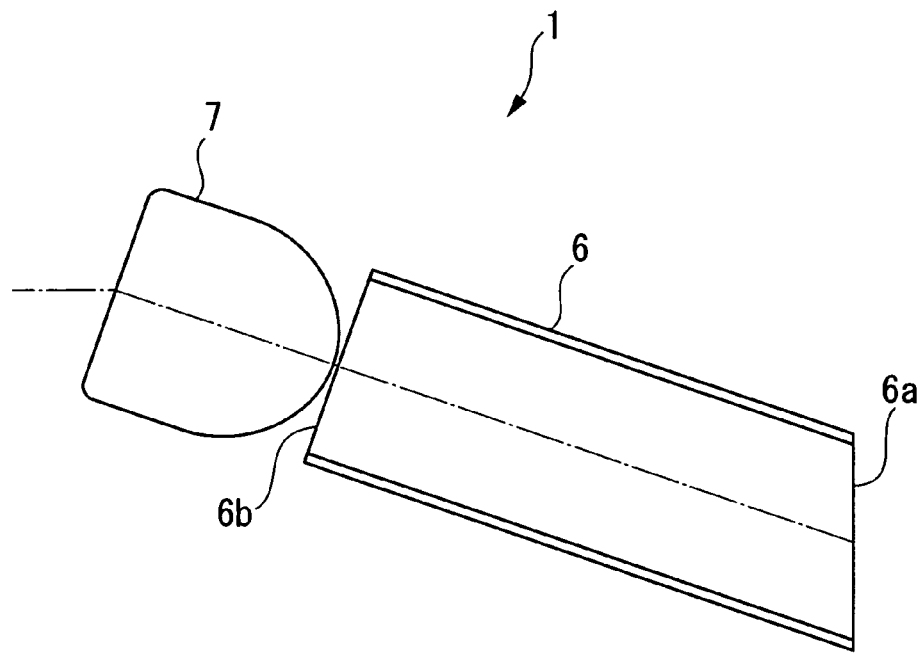
FIG. 7 is an overall configuration diagram of an illumination optical system according to a third embodiment of the present invention.

As shown in FIG. 7, the illumination optical system 1 according to this embodiment is provided with a rod lens 6 and a lens 7 disposed at a stage after the rod lens 6. One end surface of the rod lens 6 is formed at an angle with respect to a center axis thereof. Accordingly, when the one end surface (hereinafter, referred to as an incident surface) 6a is connected to a distal end surface of a light guide 8, the center axis of the rod lens 6 is disposed at an angle with respect to the incident optical axis of the light source. Therefore, light that has passed through the rod lens 6 and the lens 7 is emitted laterally with respect to the incident optical axis.

In the rod lens 6, an angle θr formed between the normal of the incident surface 6a and the normal of the other end surface (hereinafter, referred to as an emitting surface) 6b satisfies $3° \leq θr \leq 40°$, or, more preferably, satisfies $5° \leq θr \leq 30°$. If θr exceeds 40°, although light distribution can be controlled, the size in the radial direction with respect to the incident optical axis of the light source increases, and size reduction becomes difficult. On the other hand, if θr is less than 3°, a satisfactory lateral light distribution cannot be obtained.

In addition, the length L of the rod lens 6 satisfies $1.0 \leq L/Dr \leq 5.0$, or, more preferably, satisfies $1.2 \leq L/Dr \leq 4.0$. Here, L is the length of the rod lens 6 at the center thereof, and Dr is the diameter of the incident surface 6a of the rod lens 6. If L/Dr exceeds 5.0, the rod lens 6 becomes too long and size reduction cannot be achieved; if L/Dr is less than 1.0, the rod lens 6 becomes too short, an internal reflection effect in the rod lens 6 cannot be obtained sufficiently, and the light distribution cannot be controlled.

The lens 7 is a positive lens, and the diameter Din of the incident surface 6a of the rod lens 6 and a radius R1 of a curvature at a light-source side surface in the lens 7 satisfy $0.35 \leq Din/R1 \leq 1.2$, or, more preferably, satisfy $0.5 \leq Din/R1 \leq 0.9$. If Din/R1 exceeds 1.2, the curvature of the lens 7 becomes too large and processing thereof becomes difficult, and if Din/R1 is less than 0.35, the angle for light distribution becomes too small.

In addition, an optical axis length Ll from the incident surface 6a of the rod lens 6 to the emitting surface of the lens 7 and the diameter Din of the incident surface 6a of the rod lens 6 satisfy $1.5 \leq Ll/Din \leq 5.0$, or, more preferably, satisfy $2.5 \leq Ll/Din \leq 4.5$. If Ll/Din exceeds 5.0, the total optical length becomes too large and size reduction becomes difficult, and if Ll/Din is less than 1.5, the direction of the light distribution cannot be effectively changed.

The operation of the thus-configured illumination optical system 1 will be described with an example of a case in which it is employed in an endoscope.

The illumination optical system 1 according to this embodiment is, as with the first embodiment, disposed in a distal end of an inserted portion of an endoscope. Accordingly, light from a light source is radiated laterally with respect to the forward direction of the inserted portion.

At this time, in the case where lateral illumination is performed by using a reflection member, such as a prism, or the like, although refraction in 90° directions, such as lateral, rearward, etc., is easy, refraction at small angles, such as 30° forward, etc., is not handled well. If light is refracted with a prism at such small angles, the volume of the prism becomes large, or control of the light distribution becomes difficult. In addition, in the case where a direction in which light is guided is converted by bending a light guide itself, the size in the radial direction is increased, or the strength of the light guide is weakened due to the bending.

In contrast, the illumination optical system 1 according to this embodiment affords an advantage in that, by tilting the rod lens 6 with respect to the incident surface 6a, light can be reflected at small angles inside the rod lens 6, the light can be effectively deflected to illuminate laterally. In addition, an advantage is afforded in that the light distribution characteristics can be controlled while keeping the size of the endoscope in the radial direction small. In addition, one end surface of the rod lens 6 and a distal end surface of a light guide member, such as a light guide 8 etc., which guides light from the light source, can be easily connected.

Figure 8:
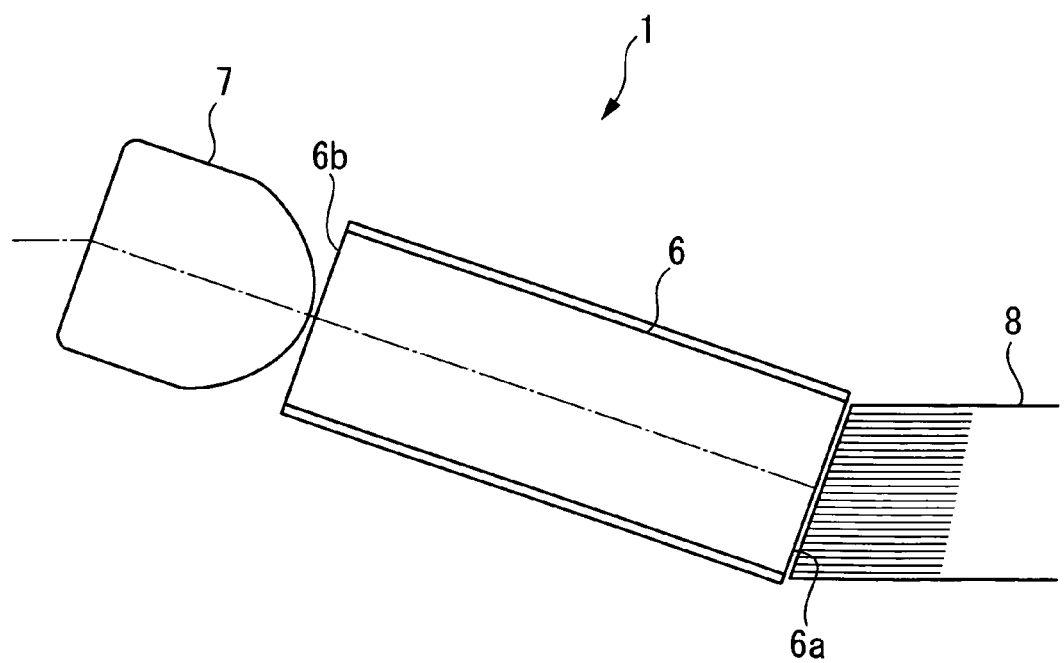
FIG. 8 is a diagram showing a modification of the illumination optical system in FIG. 7.

Although one end surface of the rod lens 6 is inclined in the above-described embodiment, alternatively, the distal end surface of the light guide 8 may be formed at an angle, as shown in FIG. 8. By doing so, as in the case where one end surface of the rod lens 6 is formed at an angle with respect to the center axis thereof, the rod lens 6 and the light guide 8 can also be connected in a state in which the center axis of the rod lens 6 is inclined with respect to the incident optical axis. Since a deflective effect is added when the light from the light source is emitted from the light guide 8, more effective light distribution control becomes possible.

In this case, an angle $\theta LG$ formed between the distal end surface of the light surface 8 and the longitudinal direction thereof preferably satisfies $3° \leq \theta LG \leq 30°$, or, more preferably, satisfies $5° \leq LG \leq 20°$. By doing so, the width by which the rod lens 6 protrudes in the radial direction with respect to the light guide 8 can be reduced, and the overall size can be reduced. If $\theta LG$ exceeds 30°, size reduction cannot be achieved, or total reflection of light occurs at the distal end surface of the light guide 8, which is not preferable; and, if $\theta LG$ is less than 3°, an appropriate light distribution becomes impossible, which is not preferable.

In addition, in the case where the distal end surface of the rod lens 6 is inclined, the length L at the center of the rod lens 6 and the diameter DLG of the emitting surface of the light guide 8 preferably satisfy $1.0 \leq L/DLG \leq 5.0$ or, more preferably, satisfy $1.2 \leq L/DLG \leq 4.0$. Accordingly, further size reduction can be achieved while obtaining an appropriate light distribution by tilting the distal end surface of the light guide 8. If L/DLG exceeds 5.0, the rod lens 6 becomes too long, which is not preferable because the size reduction cannot be achieved. On the other hand, if the L/DLG is less than 1.0, an appropriate light distribution cannot be obtained, which is not preferable.

Furthermore, although the lens 7 is a positive lens in the above-described embodiment, alternatively, a negative lens may be employed. By doing so, the light distribution of light emitted from the rod lens 6 can also be controlled more appropriately by appropriately selecting the optical properties of the lens 7.

In this case, the diameter Din of the incident surface 6a of the rod lens 6 and the radius of curvature R2 at the light-source side surface of the lens 7 preferably satisfy $0.3 \leq Din/R2 \leq 1.5$, or, more preferably, satisfy $0.5 \leq Din/R2 \leq 1.2$. If Din/R2 exceeds 1.5, the curvature of the negative lens 7 becomes too tight and processing becomes difficult, which is not preferable. On the other hand, if Din/R2 is less than 0.3, the angle for lateral light distribution becomes too small, which is not preferable.

In addition, in the case where a negative lens is employed as the lens 7, the optical axis length Ll from the incident 6a of the rod lens 6 to the emitting surface of the lens 7 and the diameter Din of the incident surface 6a of the rod lens 6 satisfy $1.2 \leq Ll/Din \leq 5.0$ or, more preferably, satisfy $1.5 \leq Ll/Din \leq 3.5$. If Ll/Din exceeds 5.0, the optical length becomes too large and size reduction becomes difficult; and, if Ll/Din is less than 1.2, the direction of the light distribution cannot be effectively changed.

Furthermore, although the illumination optical system 1 is provided with a single positive lens 7 at the stage after the rod lens 6 in the above-described embodiment, alternatively, two positive lenses may be provided. By doing so, the light distribution properties can be more precisely controlled.

In this case, the diameter Din of the incident surface 6a of the rod lens 6 and radius of curvature R3 of a surface whose curvature is the largest among the surfaces of the two positive lenses preferably satisfy $0.3 \leq Din/R3 \leq 1.5$, or, more preferably, satisfy $0.5 \leq Din/R3 \leq 1.2$. If Din/R3 exceeds 1.5, the curvature of the lens 7 becomes too large and processing becomes difficult, or the total optical length is increased to ensure edge thickness, which is disadvantageous in terms of size reduction, which it is not preferable. On the other hand, if Din/R3 is less than 0.3, the angle for lateral light distribution becomes too small, which is not preferable.

Furthermore, in the case where the two positive lenses are disposed at the stage after the rod lens 6, the axial length L1 from the incident surface 6a of the rod lens 6 to the emitting surface 6b of the positive lens and Din preferably satisfy $1.5 \leq Ll/Ein \leq 7.0$ or, more preferably, satisfy $2 \leq Ll/Din \leq 5.5$. Accordingly, size reduction can be achieved even with a configuration in which two lenses are disposed. If Ll/Din exceeds 7.0, the total optical length becomes too long and size reduction becomes difficult; and, if Ll/Din is less than 1.5, light distribution cannot be effectively controlled, which is not preferable.

The lenses 3 and 7 employed in the first and third embodiments are not limited to the positive lens and the negative lens described above, and other members, etc. provided with a transparent cover glass or a surface having optical properties are also included.

EXAMPLES

Next, Example 1 to Example 8 of the first embodiment described above will be described below with reference to FIGS. 9 to 16.

In surface data of lenses described in this specification and figures to which reference is made therein, r is the radius of curvature of each surface of the lens, d is the inter-surface distance of each lens, nd is the refractive index with respect to the d-line, vd is the Abbe number, and numbers added after r or d indicate surface numbers. The unit of length, such as r, d, etc., is mm.

For a decentered surface, amounts of decentering (X-axis direction, Y-axis direction, Z-axis direction are, respectively defined as x, y, and z) from the origin of the optical system at the position of a surface peak of that surface and inclination angles ($\alpha$, $\beta$, and $\gamma$ (°), respectively) centered around the center axes of that surface, X-axis, Y-axis, and Z-axis, respectively, are given. Positive $\alpha$ and $\beta$ indicate the counter-clockwise direction with respect to the positive directions of the respective axes, and a positive $\gamma$ indicates the clockwise direction with respect to the positive direction of the Z-axis. In addition, an inter-surface distance is given in the case where, of the optically effective surfaces that constitute an optical system of each Example, a specific surface and a subsequent surface constitute a shared-axis optical system.

Example 1

Figure 9:
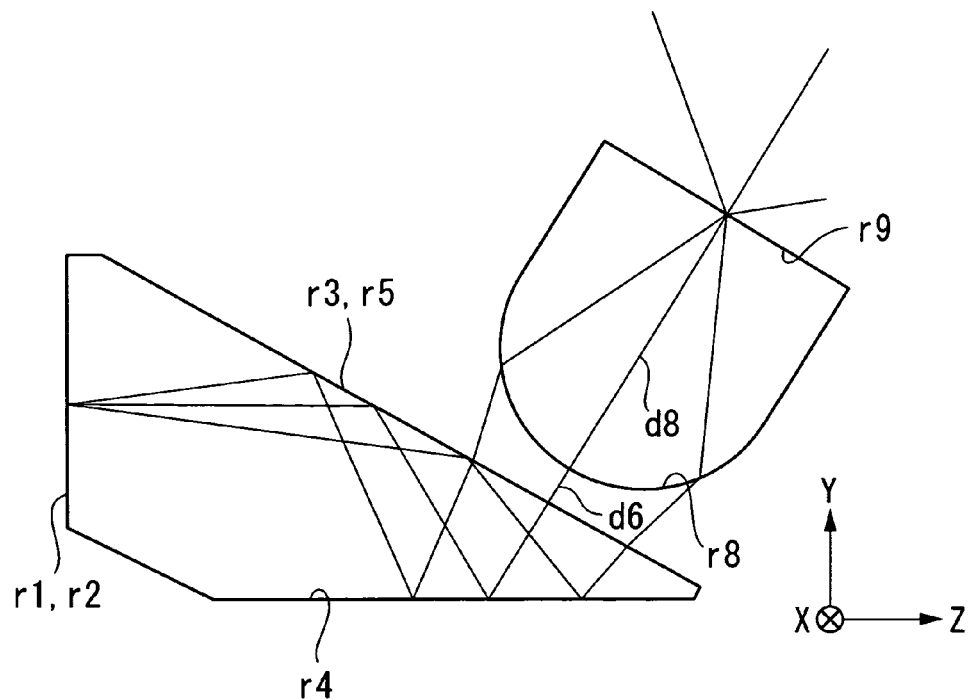
FIG. 9 is an overall configuration diagram of an illumination optical system according to Example 1 of the first embodiment of the present invention.

As shown in FIG. 9, an illumination optical system according to an Example 1 is constituted of a prism having a first transmission surface, a first reflection surface, a second reflection surface, and a second transmission surface, in this order from a light source side, and a positive lens which is flat on an object side. The individual surfaces of the prism are flat. Additionally, the first reflection surface and the second transmission surface are optically effective surfaces that exhibit both transmission effects and reflection effects. Specification of this Example is compatible with a light source with focal length of 0.788 mm and $\phi$ 1.2 mm. Decentering is the amount of decentering expressed by using the surface number 2 as a reference.

| Surface data | | | | |
|---|---|---|---|---|
| Surface number | r | d | nd | vd |
| 1 | light-source end surface | 0.000 | | |
| 2 | ∞ | 0.000 | 1.8830 | 40.76 |
| 3 | ∞ | 0.000 | 1.8830 | 40.76 |
| 4 | ∞ | 0.000 | 1.8830 | 40.76 |
| 5 | ∞ | 0.000 | 1.8830 | 40.76 |
| 6 | ∞ | 0.200 | | |
| 7 | ∞ | 0.000 | | |
| 8 | 0.700 | 1.500 | 1.8830 | 40.76 |
| 9 | ∞ | | | |

Third surface decentering

X 0.000 Y 0.000 Z 1.500
$\alpha$ −60.000 $\beta$ 0.000 $\gamma$ 0.000

Fourth surface decentering

X 0.000 Y −1.000 Z 2.077
$\alpha$ 90.000 $\beta$ 0.000 $\gamma$ 0.000

Fifth surface decentering

X 0.000 Y 0.000 Z 1.500
$\alpha$ −60.000 $\beta$ 0.000 $\gamma$ 0.000

Sixth surface decentering

X 0.000 Y −0.500 Z 2.366
$\alpha$ −60.000 $\beta$ 0.000 $\gamma$ 0.000

Example 2

Figure 10:
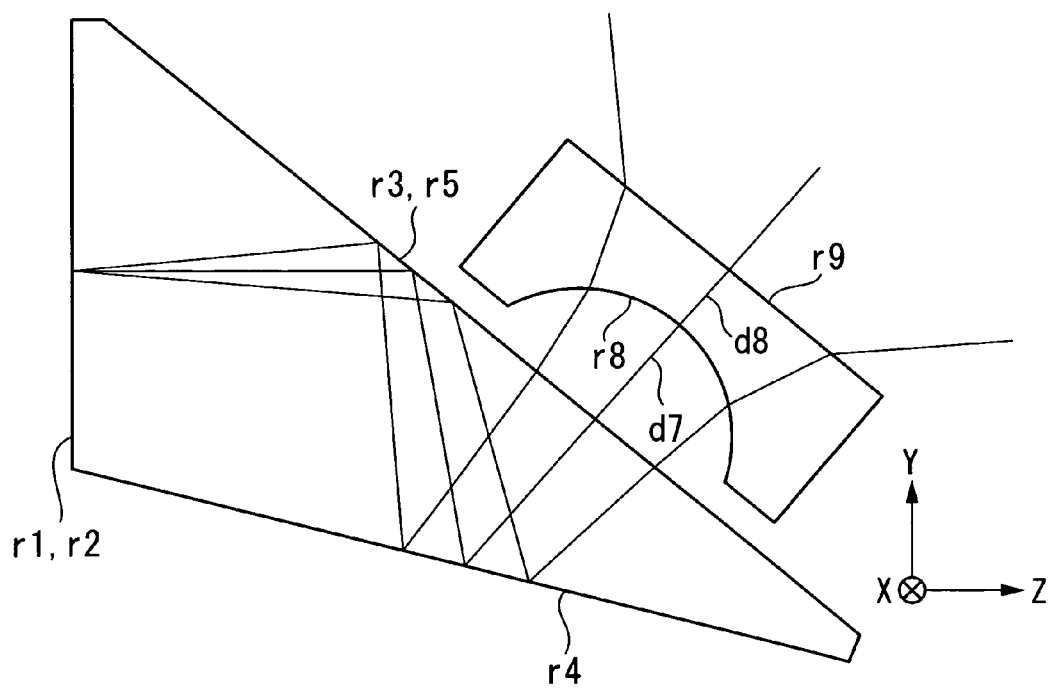
FIG. 10 is an overall configuration diagram of an illumination optical system according to Example 2 of the first embodiment of the present invention.

As shown in FIG. 10, an illumination optical system according to Example 2 is constituted of a prism having a first transmission surface, a first reflection surface, a second reflection surface, and a second transmission surface, in this order from a light source side, and a negative lens which is flat on an object side. The individual surfaces of the prism are flat. The first reflection surface and the second transmission surface are optically effective surfaces that have both transmission effects and reflection effects The specifications of this Example are compatible with a light source with focal length of −0.676 mm and $\phi$ 1.6 mm. Of the configuration parameters, decentering is the amount of decentering expressed by using the surface number 2 as a reference.

| Surface data | | | | |
|---|---|---|---|---|
| Surface number | r | d | nd | vd |
| 1 | light-source end surface | 0.000 | | |
| 2 | ∞ | 0.000 | 1.6516 | 58.55 |
| 3 | ∞ | 0.000 | 1.6516 | 58.55 |
| 4 | ∞ | 0.000 | 1.6516 | 58.55 |
| 5 | ∞ | 0.000 | 1.6516 | 58.55 |
| 6 | ∞ | 0.000 | | |
| 7 | ∞ | 0.500 | | |
| 8 | −0.600 | 0.300 | 1.8830 | 40.76 |
| 9 | ∞ | | | |

Third surface decentering

X 0.000 Y 0.000 Z 1.300
$\alpha$ −50.000 $\beta$ 0.000 $\gamma$ 0.000

Fourth surface decentering

X 0.000 Y −1.200 Z 1.512
$\alpha$ 105.000 $\beta$ 0.000 $\gamma$ 0.000

Fifth surface decentering

X 0.000 Y 0.000 Z 1.300
$\alpha$ −50.000 $\beta$ 0.000 $\gamma$ 0.000

Sixth surface decentering

X 0.000 Y −0.600 Z 2.015
$\alpha$ −50.000 $\beta$ 0.000 $\gamma$ 0.000

Example 3

Figure 11:
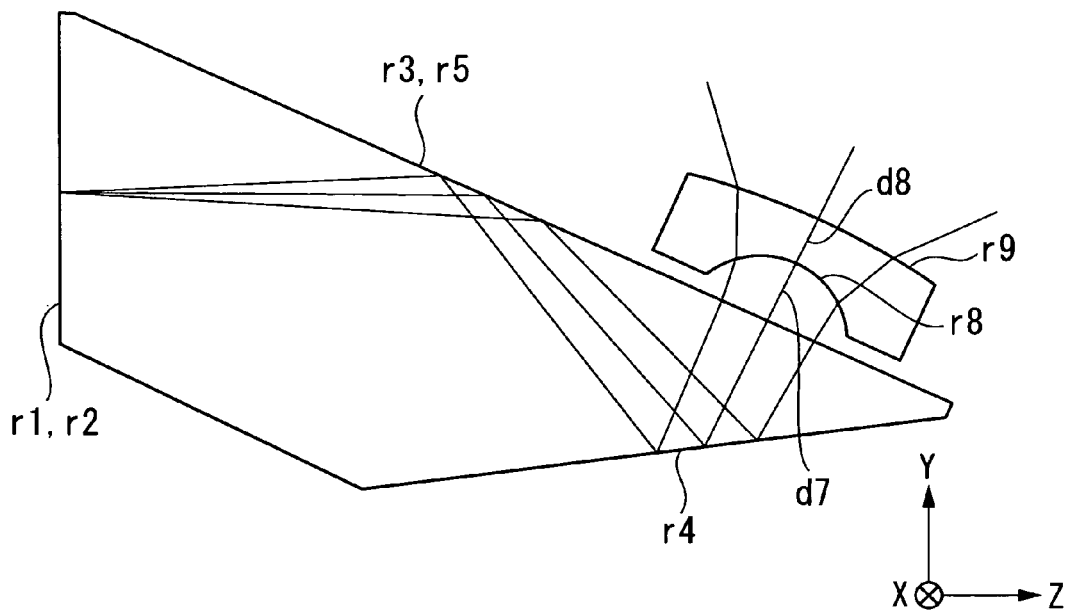
FIG. 11 is an overall configuration diagram of an illumination optical system according to Example 3 of the first embodiment of the present invention.

As shown in FIG. 11, an illumination optical system according to Example 3 is constituted of a prism having a first transmission surface, a first reflection surface, a second reflection surface, and a second transmission surface, in this order from a light source side, and a negative meniscus lens which is convex on an object side. The individual surfaces of the prism are flat. Additionally, the first reflection surface and the second transmission surface are optically effective surfaces that have both transmission effects and reflection effects. The specification of this Example are compatible with a light source with focal length of −0.646 mm and $\phi$ 1.6 mm. In addition, of the configuration parameters, decentering is the amount of decentering expressed by using the surface number 2 as a reference.

| Surface data | | | | |
|---|---|---|---|---|
| Surface number | r | d | nd | vd |
| 1 | light-source end surface | 0.000 | | |
| 2 | ∞ | 0.000 | 1.8830 | 40.76 |
| 3 | ∞ | 0.000 | 1.8830 | 40.76 |
| 4 | ∞ | 0.000 | 1.8830 | 40.76 |
| 5 | ∞ | 0.000 | 1.8830 | 40.76 |
| 6 | ∞ | 0.000 | | |
| 7 | ∞ | 0.400 | | |
| 8 | −0.500 | 0.300 | 1.8830 | 40.76 |
| 9 | −5.000 | | | |

Third surface decentering

X 0.000 Y 0.000 Z 2.500
α −65.000 β 0.000 γ 0.000

Fourth surface decentering

X 0.000 Y −1.552 Z 3.802
α 82.500 β 0.000 γ 0.000

Fifth surface decentering

X 0.000 Y 0.000 Z 2.500
α −65.000 β 0.000 γ 0.000

Sixth surface decentering

X 0.000 Y −0.776 Z 4.164
α −65.000 β 0.000 γ 0.000

Example 4

Figure 12:
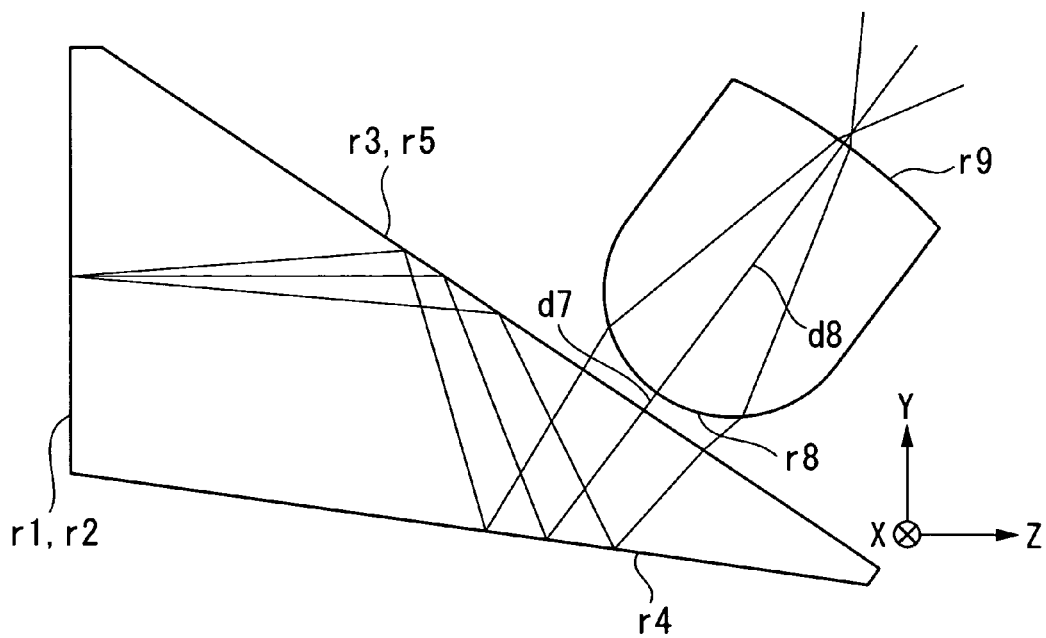
FIG. 12 is an overall configuration diagram of an illumination optical system according to Example 4 of the first embodiment of the present invention.

As shown in FIG. 12, an illumination optical system according to Example 4 is constituted of a prism having a first transmission surface, a first reflection surface, a second reflection surface, and a second transmission surface, in this order from a light source side, and a biconvex positive lens. The individual surfaces of the prism are flat. Additionally, the first reflection surface and the second transmission surface are optically effective surfaces that have both transmission effects and reflection effects. Specification of this Example is compatible with a light source with focal length of 0.630 mm and φ 1.6 mm. In addition, of the configuration parameters, decentering is the amount of decentering expressed by using the surface number 2 as a reference.

| Surface data | | | | |
|---|---|---|---|---|
| Surface number | r | d | nd | vd |
| 1 | light-source end surface | 0.000 | | |
| 2 | ∞ | 0.000 | 2.0033 | 28.27 |
| 3 | ∞ | 0.000 | 2.0033 | 28.27 |
| 4 | ∞ | 0.000 | 2.0033 | 28.27 |
| 5 | ∞ | 0.000 | 2.0033 | 28.27 |
| 6 | ∞ | 0.000 | | |
| 7 | ∞ | 0.100 | | |
| 8 | 0.550 | 1.300 | 1.8830 | 40.76 |
| 9 | −3.500 | | | |

Third surface decentering

X 0.000 Y 0.000 Z 1.500
α −55.000 β 0.000 γ 0.000

Fourth surface decentering

X 0.000 Y −1.128 Z 1.910
α 97.500 β 0.000 γ 0.000

Fifth surface decentering

X 0.000 Y 0.000 Z 1.500
α −55.000 β 0.000 γ 0.000

Sixth surface decentering

X 0.000 Y −0.564 Z 2.305
α −55.000 β 0.000 γ 0.000

Example 5

Figure 13:
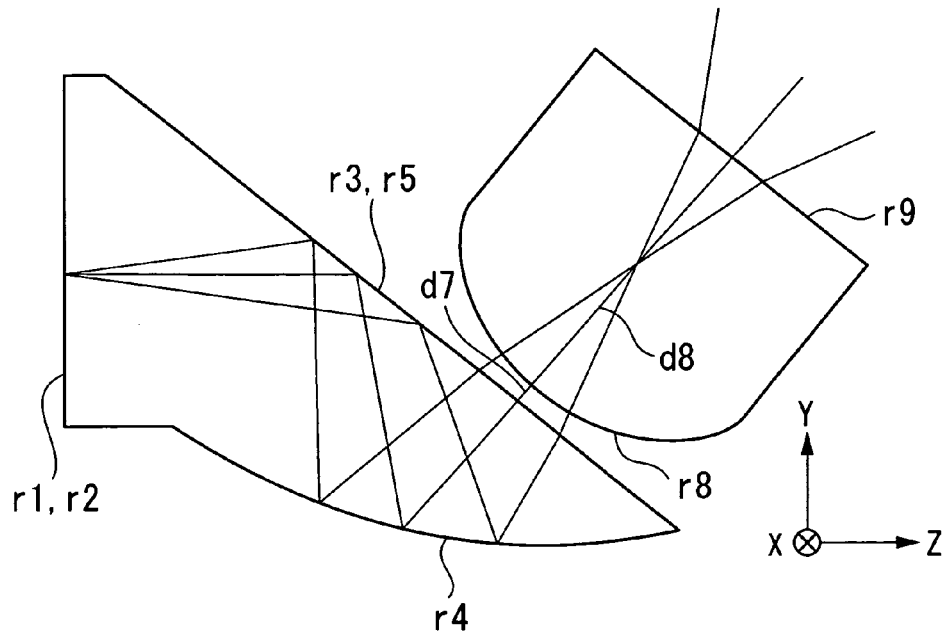
FIG. 13 is an overall configuration diagram of an illumination optical system according to Example 5 of the first embodiment of the present invention.

As shown in FIG. 13, an illumination optical system according to Example 5 is constituted of a prism having a first transmission surface, a first reflection surface, a second reflection surface, and a second transmission surface, in this order from a light source side, and a positive lens which is flat on an object side. Additionally, the first reflection surface and the second transmission surface are optically effective surfaces that have both transmission effects and reflection effects. In addition, the first transmission surface, the second reflection surface, and the second transmission surface are formed flat, and the first reflection surface is formed as a non-rotationally symmetrical aspherical surface. The specifications of this Example are compatible with a light source with focal length of 1.013 mm and φ 1.4 mm. In addition, of the configuration parameters, decentering is the amount of decentering expressed by using the surface number 2 as a reference.

The shape of a surface which is a non-rotationally symmetric aspherical surface employed in this Example is defined by the following Expression (A). The Z-axis in this definition expression serves as an axis of a free-form surface.

$Z = c1 +$ $c2x + c3y +$ $c4x^2 + c5xy + c6y^2 +$ $c7x^3 + c9xy^2 + c8x^2y + c10y^3 +$ $c11x^4 + c12x^3y + c13x^2y^2 + c14xy^3 + c15y^4 +$ $c16x^5 + c17x^4y + c18x^3y^2 + c19x^2y^3 + c20xy^4 + c21y^5 +$ $c22x^6 + c23x^5y + c24x^4y^2 + c25x^3y^3 + c26x^2y^4 + c27x$ $y^5 + c28y^6 +$ $c29x^7 + c30x^6y + c31x^5y^2 + c32x^4y^3 + c33x^3y^4 + c34x^2$ $y^5 + c35xy^6 + c36$ $y^7$ (A)

Surface data

| Surface number | r | d | nd | vd |
|---|---|---|---|---|
| 1 | light-source end surface | 0.000 | | |
| 2 | ∞ | 0.000 | 1.6516 | 58.55 |
| 3 | ∞ | 0.000 | 1.6516 | 58.55 |
| 4 | (aspherical surface) | 0.000 | 1.6516 | 58.55 |
| 5 | ∞ | 0.000 | 1.6516 | 58.55 |
| 6 | ∞ | 0.000 | | |
| 7 | ∞ | 0.100 | | |
| 8 | 0.900 | 1.400 | 1.8830 | 40.76 |
| 9 | ∞ | | | |

Fourth surface (aspherical surface)

C4 −1.0000E−01
C6 −2.0000E−01
C7 −1.0000E−02

Third surface decentering

X 0.000 Y 0.000 Z 1.300
α −50.000 β 0.000 γ 0.000

Fourth surface decentering

X 0.000 Y −1.200 Z 1.512
α 105.000 β 0.000 γ 0.000

Fifth surface decentering

X 0.000 Y 0.000 Z 1.300
α −50.000 β 0.000 γ 0.000

Sixth surface decentering

X 0.000 Y −0.600 Z 2.015
α −50.000 β 0.000 γ 0.000

Example 6

Figure 14:
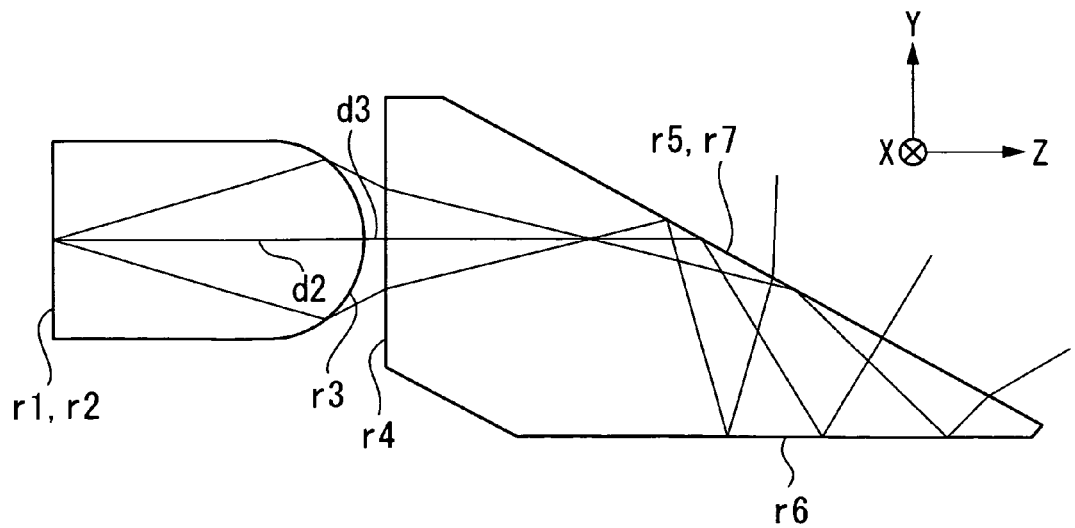
FIG. 14 is an overall configuration diagram of an illumination optical system according to Example 6 of the first embodiment of the present invention.

As shown in FIG. 14, an illumination optical system according to Example 6 is constituted of a positive lens which is flat on a light source side and a prism having a first transmission surface, a first reflection surface, a second reflection surface, and a second transmission surface, in this order from a light source side. The individual surfaces of the prism are flat. Additionally, the first reflection surface and the second transmission surface are optically effective surfaces that have both transmission effects and reflection effects. The specifications of this Example are compatible with a light source with focal length of 0.619 mm and φ 1.0 mm. In addition, of the configuration parameters, decentering is the amount of decentering expressed by using the surface number 4 as a reference.

Surface data

| Surface number | r | d | nd | vd |
|---|---|---|---|---|
| 1 | light-source end surface | 0.000 | | |
| 2 | ∞ | 1.500 | 1.8830 | 40.76 |
| 3 | −0.550 | 0.100 | | |
| 4 | ∞ | 0.000 | | |
| 5 | ∞ | 0.000 | 1.8830 | 40.76 |
| 6 | ∞ | 0.000 | 1.8830 | 40.76 |
| 7 | ∞ | 0.000 | 1.8830 | 40.76 |
| 8 | ∞ | 0.000 | 1.8830 | 40.76 |
| 9 | ∞ | 0.000 | | |
| 10 | ∞ | | | |

Fifth surface decentering

X 0.000 Y 0.000 Z 1.500
α −60.000 β 0.000 γ 0.000

Sixth surface decentering

X 0.000 Y −1.000 Z 2.077
α 90.000 β 0.000 γ 0.000

Seventh surface decentering

X 0.000 Y 0.000 Z 1.500
α −60.000 β 0.000 γ 0.000

Eighth surface decentering

X 0.000 Y −0.500 Z 2.366
α −60.000 β 0.000 γ 0.000

Example 7

Figure 15:
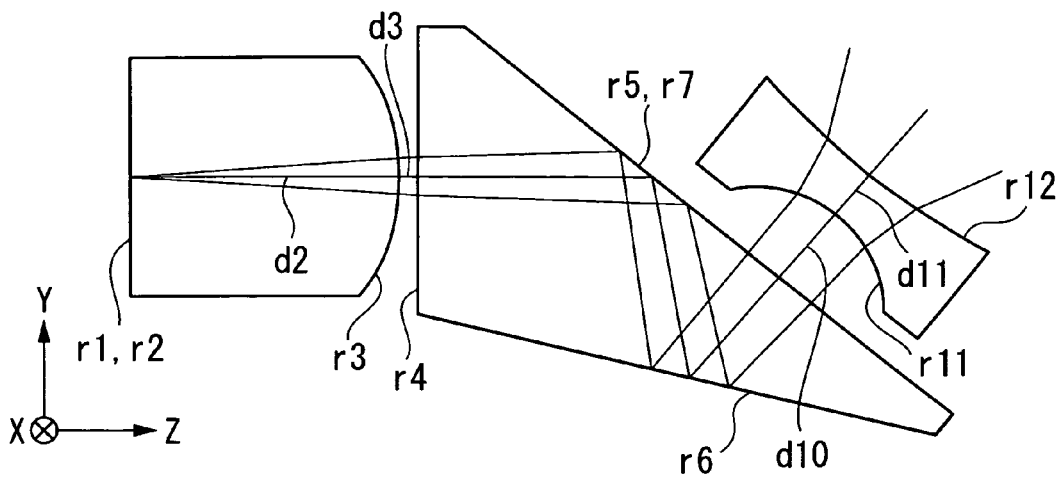
FIG. 15 is an overall configuration diagram of an illumination optical system according to Example 7 of the first embodiment of the present invention.

As shown in FIG. 15, an illumination optical system according to Example 7 is constituted of a positive lens which is flat on a light source side and a prism having a first transmission surface, a first reflection surface, a second reflection surface, and a second transmission surface, and a biconcave negative lens, in this order from a light source side. The individual surfaces of the prism are flat. Additionally, the first reflection surface and the second transmission surface are optically effective surfaces that have both transmission effects and reflection effects. The specifications of this Example are compatible with a light source with focal length of 0.254 mm and φ 0.8 mm. In addition, of the configuration parameters, decentering is the amount of decentering expressed by using the surface number 4 as a reference.

Surface data

| Surface number | r | d | nd | vd |
|---|---|---|---|---|
| 1 | light-source end surface | 0.000 | | |
| 2 | ∞ | 1.500 | 1.8830 | 40.76 |
| 3 | −1.200 | 0.100 | | |
| 4 | ∞ | 0.000 | | |
| 5 | ∞ | 0.000 | 1.6516 | 58.55 |
| 6 | ∞ | 0.000 | 1.6516 | 58.55 |
| 7 | ∞ | 0.000 | 1.6516 | 58.55 |
| 8 | ∞ | 0.000 | 1.6516 | 58.55 |
| 9 | ∞ | 0.000 | | |
| 10 | ∞ | 0.500 | | |
| 11 | −0.700 | 0.300 | 1.8830 | 40.76 |
| 12 | 5.000 | | | |

Fifth surface decentering

X 0.000 Y 0.000 Z 1.300
α −50.000 β 0.000 γ 0.000

Sixth surface decentering

X 0.000 Y −1.200 Z 1.512
α 105.000 β 0.000 γ 0.000

Seventh surface decentering

X 0.000 Y 0.000 Z 1.300
α −50.000 β 0.000 γ 0.000

-continued

Eighth surface decentering

X 0.000 Y −0.600 Z 2.015
α −50.000 β 0.000 γ 0.000

Example 8

Figure 16:
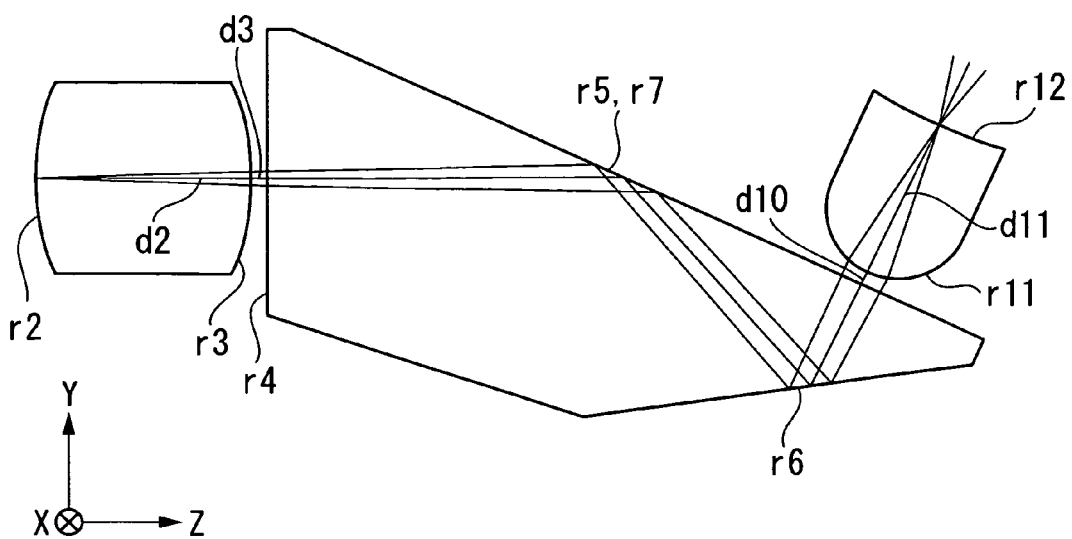
FIG. 16 is an overall configuration diagram of an illumination optical system according to Example 8 of the first embodiment of the present invention.

As shown in FIG. 16, an illumination optical system according to Example 8 is constituted of a biconvex positive lens, a prism having a first transmission surface, a first reflection surface, a second reflection surface, and a second transmission surface, and a biconcave negative lens, in this order from a light source side. The individual surfaces of the prism are flat. Additionally, the first reflection surface and the second transmission surface are optically effective surfaces that have both transmission effects and reflection effects. The specifications of this Example are compatible with a light source with focal length of 0.254 mm and φ 1.0 mm. In addition, of the configuration parameters, decentering is the amount of decentering expressed by using the surface number 4 as a reference.

| Surface data | | | | |
|---|---|---|---|---|
| Surface number | r | d | nd | vd |
| 1 | light-source end surface | 0.000 | | |
| 2 | 2.000 | 1.500 | 1.8830 | 40.76 |
| 3 | −1.600 | 0.100 | | |
| 4 | ∞ | 0.000 | | |
| 5 | ∞ | 0.000 | 1.8830 | 40.76 |
| 6 | ∞ | 0.000 | 1.8830 | 40.76 |
| 7 | ∞ | 0.000 | 1.8830 | 40.76 |
| 8 | ∞ | 0.000 | 1.8830 | 40.76 |
| 9 | ∞ | 0.000 | | |
| 10 | ∞ | 0.100 | | |
| 11 | 0.500 | 1.200 | 1.8830 | 40.76 |
| 12 | 5.000 | | | |

Fifth surface decentering

X 0.000 Y 0.000 Z 2.500
α −65.000 β 0.000 γ 0.000
Sixth surface decentering

X 0.000 Y −1.552 Z 3.802
α 82.500 β 0.000 γ 0.000
Seventh surface decentering

X 0.000 Y 0.000 Z 2.500
α −65.000 β 0.000 γ 0.000

X 0.000 Y −0.776 Z 4.164
α −65.000 β 0.000 γ 0.000

The specifications of the illumination optical systems according to Examples 1 to 8 are shown in Table 1. θ is an angle formed between the normal of the first reflection surface (transmission/reflection surface) of the prism and the second reflection surface thereof, and n is the refractive index of the prism. SF1, SF2, and SF3 are values related to the positive lens disposed on the light source side of the prism, a negative lens disposed on the light source side of the prism, and a positive lens disposed on the object side of the prism, respectively, and are defined by (R1+R2)/(R1−R2). Here, R1 is the radius of curvature at the object side surface of each lens, and R2 is the radius of curvature at the light-source side surface of each lens.

TABLE 1

| | Example | | | | | | | |
|---|---|---|---|---|---|---|---|---|
| | 1 | 2 | 3 | 4 | 5 | 6 | 7 | 8 |
| θ | 60 | 50 | 65 | 55 | 50 | 60 | 50 | 65 |
| n | 1.888 | 1.654 | 1.888 | 2.012 | 1.654 | 1.888 | 1.654 | 1.888 |
| SF1 | 1 | — | — | 0.728 | 1 | — | — | 0.818 |
| SF2 | — | 1 | 1.22 | — | — | — | 0.754 | — |
| SF3 | — | — | — | — | — | −1 | −1 | 0.111 |

Next, Examples 9 to 16 of the second embodiment will be described below with reference to FIGS. 17 to 24.

Example 9

Figure 17:
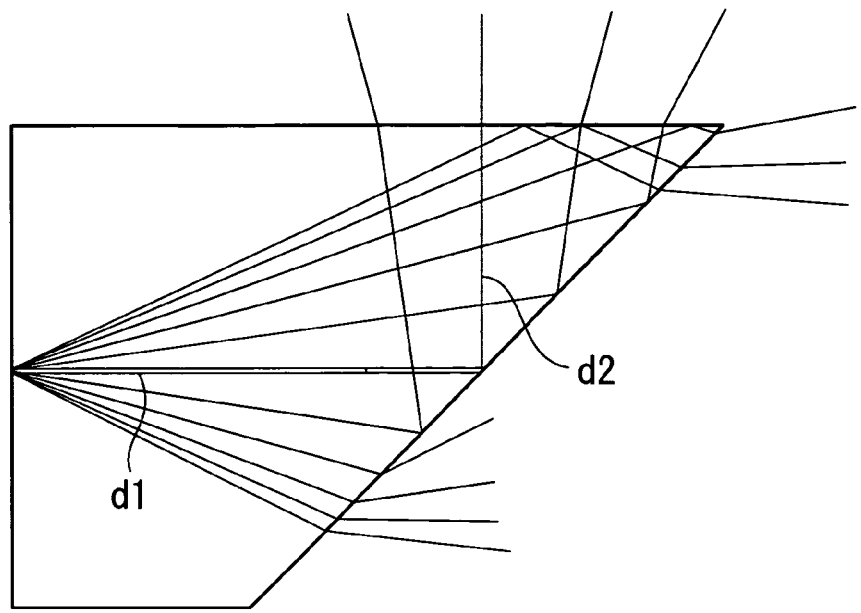
FIG. 17 is an overall configuration diagram of an illumination optical system according to Example 9 of the second embodiment of the present invention.

As shown in FIG. 17, an illumination optical system according to Example 9 is constituted of a columnar prism formed of a first transmission surface, first reflection surface, and a second transmission surface, in this order from a light source side. In the prism, the angle of the first reflection surface relative to an incident optical axis thereof is 45°; the diameter is 2 mm at a position where a cross-section in a direction perpendicular to a center axis thereof is circular; the optical axis distance d1 from the first transmission surface to the first reflection surface is 2 mm; and the optical axis distance d2 from the first reflection surface to the second transmission surface is 1 mm. The glass material is composed of S-LAH58 (OHARA).

Example 10

Figure 18:
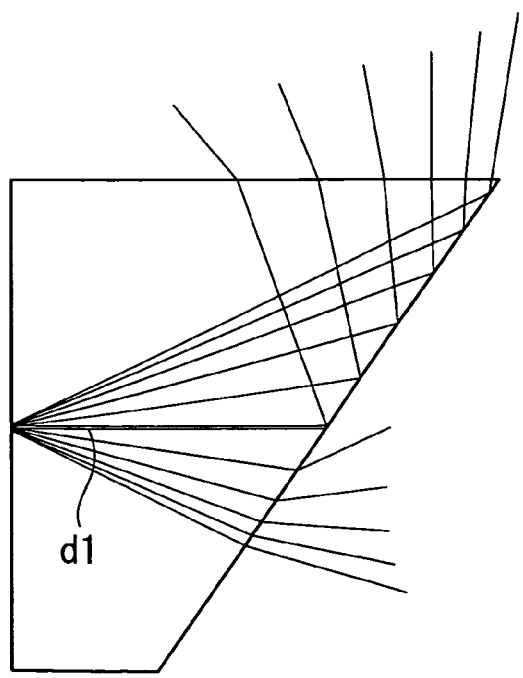
FIG. 18 is an overall configuration diagram of an illumination optical system according to Example 10 of the second embodiment of the present invention.

As shown in FIG. 18, an illumination optical system according to Example 10 is constituted of a columnar prism formed of a first transmission surface, first reflection surface, and a second transmission surface, in this order from a light source side. In the prism, the angle of the first reflection surface relative to an incident optical axis thereof is 60°; the diameter is 2 mm at a position where a cross-section in a direction perpendicular to a center axis thereof is circular; the optical axis distance d1 from the first transmission surface to the first reflection surface is 1.3 mm; and the optical axis distance d2 from the first reflection surface to the second transmission surface is 1.414 mm. In addition, the glass material is composed of S-LAH58 (OHARA).

Example 11

Figure 19:
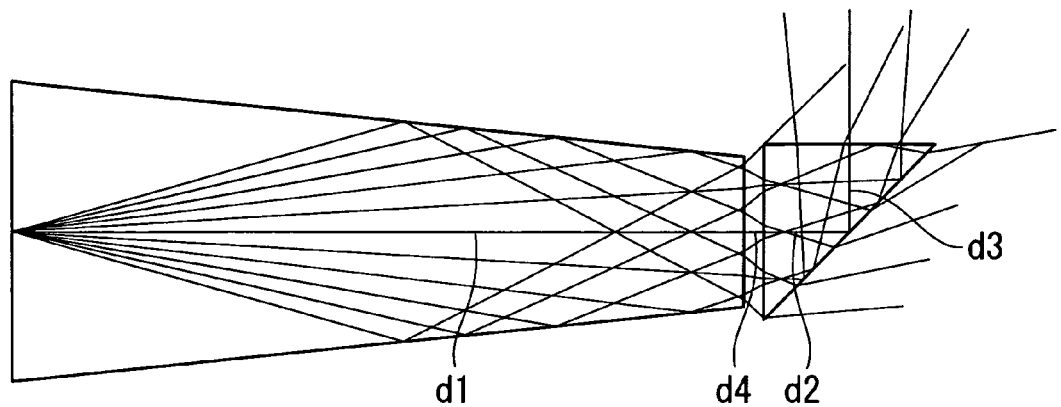
FIG. 19 is an overall configuration diagram of an illumination optical system according to Example 11 of the second embodiment of the present invention.

As shown in FIG. 19, an illumination optical system according to Example 11 is constituted of a tapered rod prism in which the area of an object-side end surface is smaller as compared with a light source side and a prism having a first transmission surface, first reflection surface, and a second transmission surface, in this order from a light source side. A light-source-side end surface of the tapered rod prism has a circular shape with φ 1.2 mm, the object-side end surface is a circular shape with φ 0.6 mm, and the inter-surface distance d1 between these end surfaces is 3 mm. φ indicates diameter. In the prism, the angle of the first reflection surface relative to an incident optical axis thereof is 45°. The first and second transmission surfaces have rectangular shapes of 0.707 mm (in a direction along the plane of the figure)×0.8 mm (in a direction perpendicular to the plane of the figure).

The optical axis distance d2 from the first transmission surface to the first reflection surface and the optical axis distance d3 from the first reflection surface to the second transmission surface are 0.354 mm. The inter-surface distance d4 between the object-side end surface of the tapered rod prism and a light-source side surface of the prism is 0.085 mm. The tapered rod prism and the prism are composed of the glass material S-LAH58 (OHARA), and the refractive index thereof with respect to the d-line is 1.516.

Example 12

Figure 20:
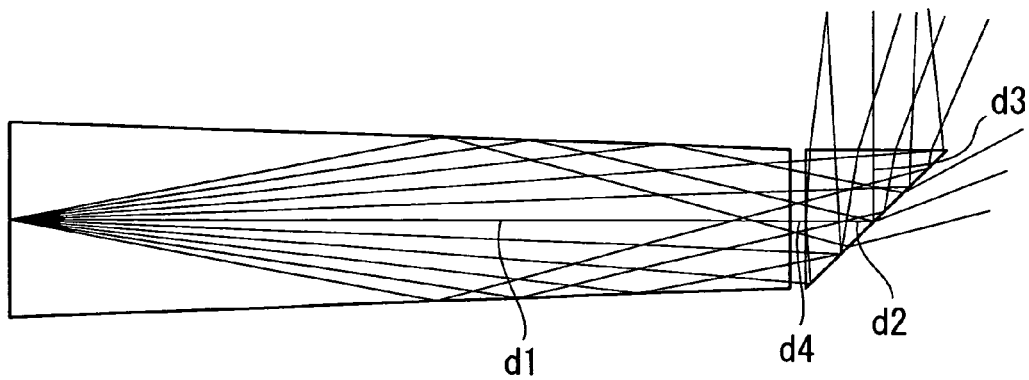
FIG. 20 is an overall configuration diagram of an illumination optical system according to Example 12 of the second embodiment of the present invention.

As shown in FIG. 20, an illumination optical system according to Example 12 is constituted of a tapered rod prism in which the area of an object-side end surface is smaller as compared with a light-source-side end surface and a prism having a first transmission surface, a first reflection surface, and a second transmission surface, in this order from a light source side. The light-source-side end surface of the tapered rod prism has a circular shape with φ 1.0 mm, the object-side end surface is a circular shape with φ 0.7 mm, and the inter-surface distance d1 between these end surfaces is 4 mm.

In the prism, the angle of the reflection surface relative to an incident optical axis is 45°, and the first and second transmission surfaces have rectangular shapes of 0.707 mm (in a direction along the plane of the figure)×0.8 mm (in a direction perpendicular to the plane of the figure). The optical axis distance d2 from the first transmission surface to the first reflection surface and the optical axis distance d3 from the first reflection surface to the second transmission surface are 0.354 mm. In addition, the inter-surface distance d4 between the object-side end surface of the tapered rod prism and a light-source side surface of the prism is 0.085 mm. The tapered rod prism and the prism are composed of the glass material S-LAL7 (OHARA), and the refractive index thereof with respect to the d-line is 1.516.

Example 13

Figure 21:
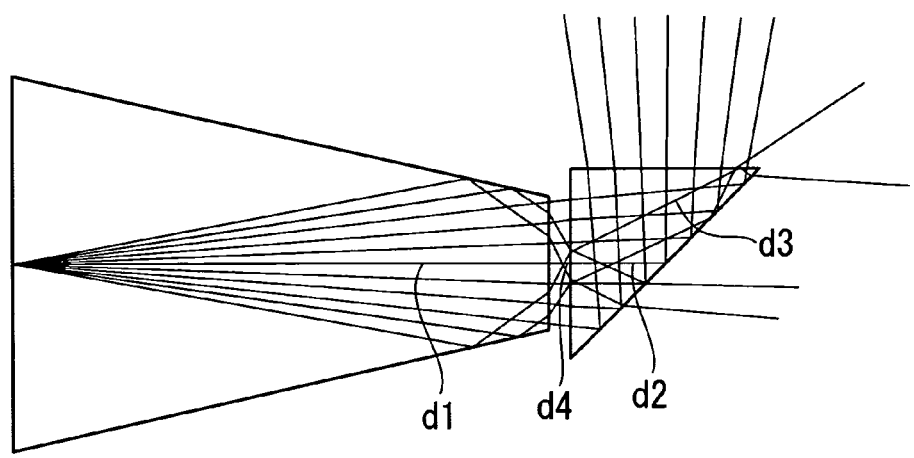
FIG. 21 is an overall configuration diagram of an illumination optical system according to Example 13 of the second embodiment of the present invention.

As shown in FIG. 21, an illumination optical system according to Example 13 is constituted of a tapered rod prism in which the area of an object side is smaller as compared with a light source side and a prism having a first transmission surface, a first reflection surface, and a second transmission surface, in this order from a light source side. The light-source-side end surface of the tapered rod prism has a circular shape with φ 1.4 mm, the object-side end surface is a circular shape with φ 0.5 mm, and the inter-surface distance d1 between these end surfaces is 2 mm.

In the prism, the angle of the reflection surface relative to an incident optical axis is 45°, and the first and second transmission surfaces have rectangular shapes of 0.707 mm (in a direction along the plane of the figure)×0.8 mm (in a direction perpendicular to the plane of the figure). The optical axis distance d2 from the first transmission surface to the first reflection surface and an optical axis distance d3 from the first reflection surface to the second transmission surface is 0.354 mm. In addition, the inter-surface distance d4 between the object-side end surface of the tapered rod prism and the light-source-side surface of the prism is 0.085 mm. The tapered rod prism and the prism are composed of the glass material S-LAH79 (OHARA), and the refractive index thereof with respect to the d-line is 1.516.

Example 14

Figure 22:
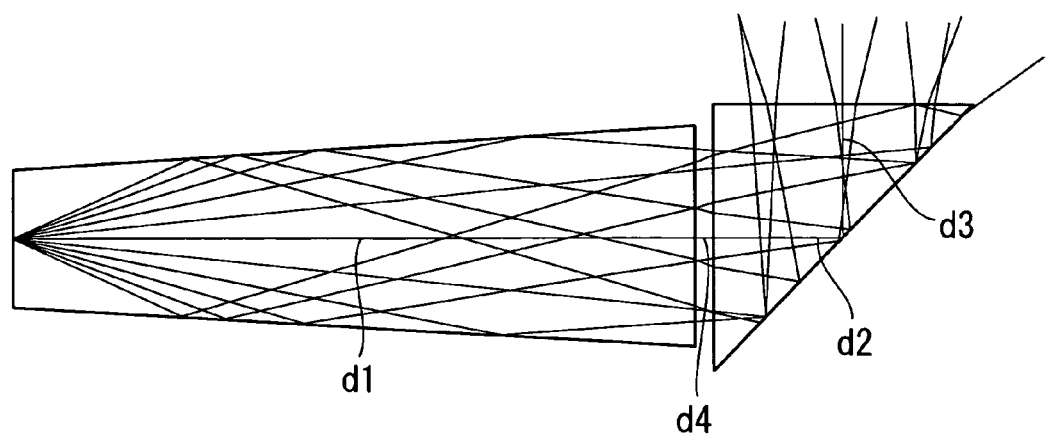
FIG. 22 is an overall configuration diagram of an illumination optical system according to Example 14 of the second embodiment of the present invention.

As shown in FIG. 22, an illumination optical system according to Example 14 is constituted of a tapered rod prism in which the area of an object-side end surface is larger as compared with a light-source-side end surface and a prism having a first transmission surface, first reflection surface, and a second transmission surface, in this order from a light source side. The light-source-side end surface of the tapered rod prism has a circular shape with φ 0.6 mm, the object-side end surface is a circular shape with φ 1.3 mm, and the inter-surface distance d1 between these end surfaces is 4 mm.

In the prism, the angle of the reflection surface relative to an incident optical axis is 45°, and the first and second transmission surfaces have rectangular shapes of 1.556 mm (in a direction along the plane of the figure)×1.6 mm (in a direction perpendicular to the plane of the figure). An optical axis distance d2 from the first transmission surface to the first reflection surface and an optical axis distance d3 from the first reflection surface to the second transmission surface are 0.778 mm. In addition, inter-surface distance d4 between the object-side end surface of the tapered rod prism and a light-source side surface of the prism is 0.1 mm. The tapered rod prism and the prism are composed of the glass material S-LAH58 (OHARA), and the refractive index thereof with respect to the d-line is 1.516.

Example 15

Figure 23:
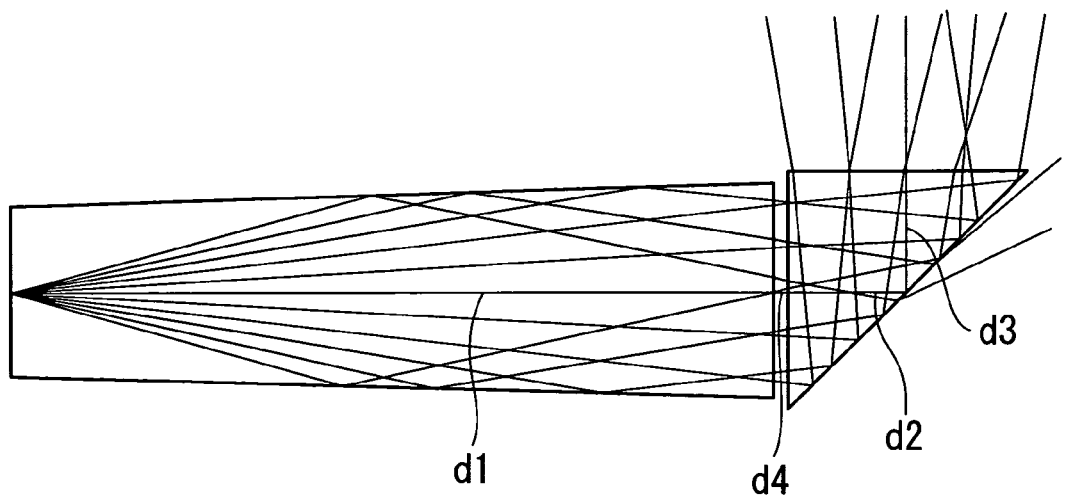
FIG. 23 is an overall configuration diagram of an illumination optical system according to Example 15 of the second embodiment of the present invention.

As shown in FIG. 23, an illumination optical system according to Example 15 is constituted of a tapered rod prism in which the area of an object-side end surface is larger as compared with a light-source-side end surface and a prism having a first transmission surface, a first reflection surface, and a second transmission surface, in this order from a light source side. The light-source-side end surface of the tapered rod prism has a circular shape with φ 1.1 mm, the object-side end surface is a circular shape with φ 1.4 mm, and the inter-surface distance d1 between these end surfaces is 5 mm.

In the prism, the angle of the reflection surface relative to an incident optical axis is 45°, and the first and second transmission surfaces have rectangular shapes of 1.556 mm (in a direction along the plane of the figure)×1.6 mm (in a direction perpendicular to the plane of the figure). An optical axis distance d2 from the first transmission surface to the first reflection surface as well as an optical axis distance d3 from the first reflection surface to the second transmission surface is 0.778 mm. In addition, an inter-surface distance d4 between the object-side end surface of the tapered rod prism and a light-source-side surface of the prism is 0.1 mm. The tapered rod prism and the prism are composed of the glass material S-LAL7 (OHARA), and the refractive index thereof with respect to the d-line is 1.516.

Example 16

Figure 24:
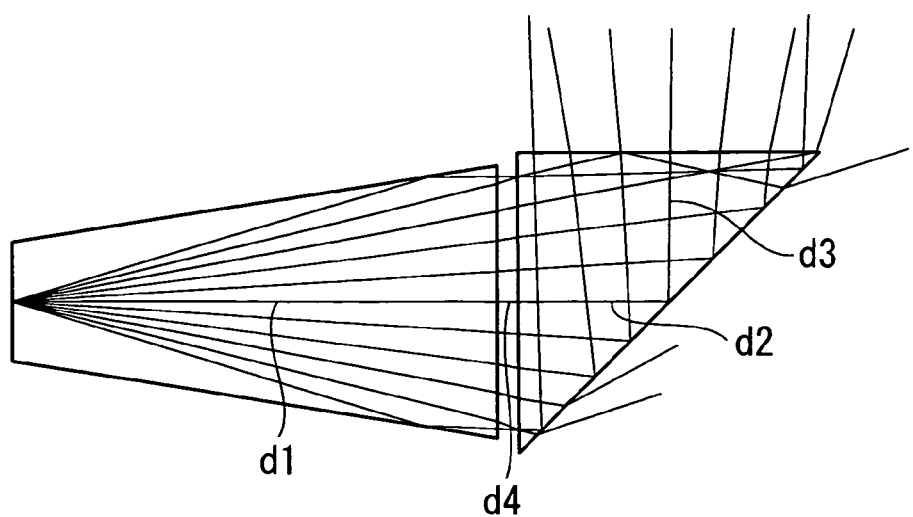
FIG. 24 is an overall configuration diagram of an illumination optical system according to Example 16 of the second embodiment of the present invention.

As shown in FIG. 24, an illumination optical system according to Example 16 is constituted of a tapered rod prism in which the area of an object-side end surface is larger as compared with a light-source-side end surface and a prism having a first transmission surface, a first reflection surface, and a second transmission surface, in this order from a light source side. The light-source-side end surface of the tapered rod prism has a circular shape with φ 0.4 mm, the object-side end surface is a circular shape with φ 1.6 mm, and the inter-surface distance d1 between these end surfaces is 2.5 mm.

In the prism, the angle of the reflection surface relative to an incident optical axis is 45°, and the first and second transmission surfaces have rectangular shapes of 1.556 mm (in a direction along the plane of the figure)×1.6 mm (in a direction perpendicular to the plane of the figure). The optical axis distance d2 from the first transmission surface to the first reflection surface and the optical axis distance d3 from the first reflection surface to the second transmission surface is 0.778 mm. The inter-surface distance d4 between the object-side end surface of the tapered rod prism and a light-source side surface of the prism is 0.1 mm. The tapered rod prism and the prism are formed of the glass material S-LAL7 (OHARA), and the refractive index thereof with respect to the d-line is 1.516.

The specifications of the illumination optical systems according to Examples 9 to 16, configured as above, are shown in Table 2. np is the refractive index of the prism, θp is an angle of a reflection surface (inclined surface) relative to the center axis (incident optical axis) of the prism, nt is the refractive index of the tapered rod prism, Din is the diameter of the tapered rod prism at larger one of the light-source-side end surface and the object-side end surface, Lt is the length of the center axis of the tapered rod prism, Sout is the area of the object-side end surface of the tapered rod prism, and Sin is the area of the light-source-side end surface of the tapered rod prism.

TABLE 2

| | Example | | | | | | | |
|---|---|---|---|---|---|---|---|---|
| | 9 | 10 | 11 | 12 | 13 | 14 | 15 | 16 |
| np | 1.888 | 1.888 | — | — | — | — | — | — |
| θp | 45 | 60 | — | — | — | — | — | — |
| nt | — | — | 1.516 | 1.516 | 1.516 | 1.516 | 1.516 | 1.516 |
| Din/Lt | — | — | 2.50 | 4.00 | 1.43 | 3.08 | 3.57 | 1.56 |
| Sout/Sin | — | — | 0.25 | 0.49 | 0.13 | — | — | — |
| Sin/Sout | — | — | — | — | — | 0.21 | 0.62 | 0.06 |

Next, Examples 17 to 23 of the third embodiment of the present invention will be described below with reference to FIGS. 25 to 32. Aspherical surfaces in Examples 17 to 23 are defined by the following Expression (2). In addition, in the surface data, * is added after the surface number of an aspherical surface.

$$Z = (y^2/R)/\left[1 + \{1 - (1+K)y^2/R^2\}^{1/2}\right] + Ay^4 + By^6 + Cy^8 + Dy^{10} + \ldots \quad (2)$$

Z is assumed to be an optical axis where the traveling direction of light is positive, and y is assumed to a direction perpendicular to the optical axis. Here, R is the diameter of paraxial curvature, K is a conic coefficient, A, B, C, D, . . . are fourth order, sixth order, eight order, and tenth order aspherical surface coefficients, respectively. The Z-axis in this definition expression serves as an axis for a rotationally symmetrical aspherical surface.

In addition, in Examples 17 to 23, the rod lens has different optical properties in a core portion (center portion) and a cladding portion (peripheral portion). In the surface data, nd_core and nd_clad are the refractive indices for the core portion (center portion) of the rod lens and the cladding portion (peripheral portion) thereof with respect to the d-line, respectively, and core φ is the radius of the core portion of the rod lens.

Example 17

Figure 25:
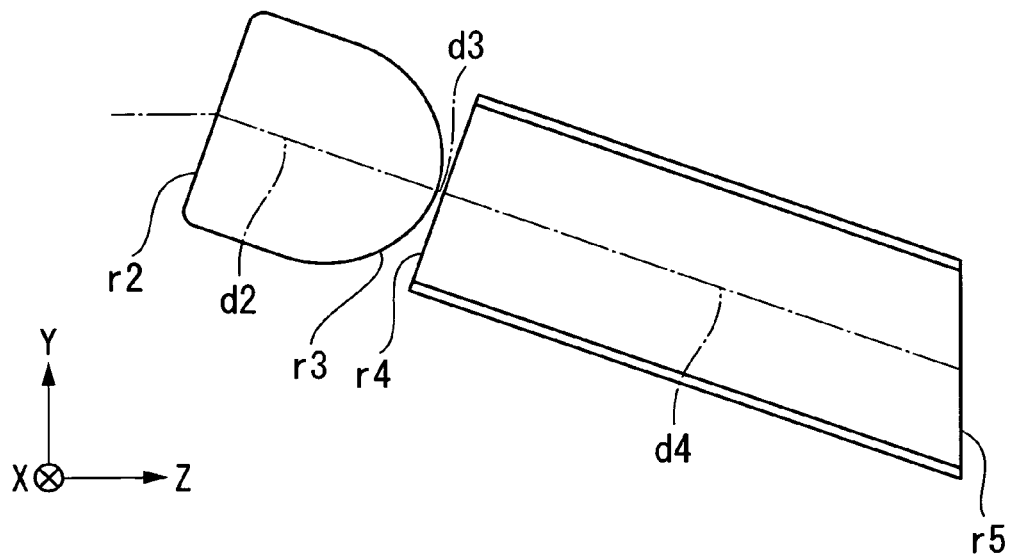
FIG. 25 is an overall configuration diagram of an illumination optical system according to Example 17 of the third embodiment of the present invention.

As shown in FIG. 25, an illumination optical system according to Example 17 is constituted of a positive lens, which is flat on an object side, and a rod lens in which both end surfaces are flat, in this order from an object side. An incident surface and an emitting surface of the rod lens are inclined and decentered. The specifications of this Example are compatible with a light source with a focal length of 0.788 mm and φ 1.4 mm. Of the configuration parameters, surface number 1 is used as a reference for decentering of a second surface and surface number 4 is used as a reference for decentering of a fifth surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 1.700 | 1.8830 | 40.76 | | | |
| 3* | −0.700 | 0.040 | | | | | |
| 4 | ∞ | 4.000 | (rod lens) | | 1.728 | 1.516 | 0.72 |
| 5 | ∞ | 0.000 | | | | | |
| 6 | light-source end surface | | | | | | |

Third aspherical surface

K −0.500 A 0.000 B 0.000

Second surface decentering

X 0.000 Y 0.000 Z 0.000
α 20.000 β 0.000 γ 0.000

Fifth surface decentering

X 0.000 Y 0.000 Z 0.000
α −20.000 β 0.000 γ 0.000

Example 18

Figure 26:
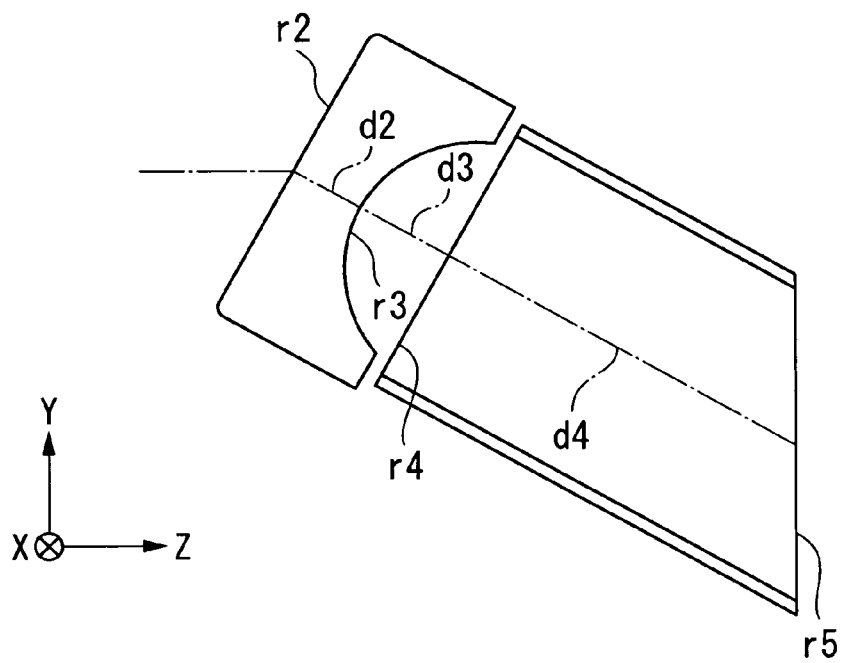
FIG. 26 is an overall configuration diagram of an illumination optical system according to Example 18 of the third embodiment of the present invention.

As shown in FIG. 26, an illumination optical system according to Example 18 is constituted of a negative lens, which is flat on an object side, and a rod lens in which both end surfaces are flat, in this order from the object side. An incident surface and an emitting surface of the rod lens are inclined and decentered. The specifications of this Example are compatible with a light source with focal length of −0.788 mm and φ 1.4 mm. Of the configuration parameters, surface number 1 is used as a reference for decentering of a second surface and surface number 4 is used as a reference for decentering of a fifth surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 0.400 | 1.8830 | 40.76 | | | |
| 3 | 0.700 | 0.500 | | | | | |
| 4 | ∞ | 2.000 | (rod lens) | | 1.728 | 1.516 | 0.72 |
| 5 | ∞ | 0.000 | | | | | |
| 6 | light-source end surface | | | | | | |

Second surface decentering

X 0.000 Y 0.000 Z 0.000
α 30.000 β 0.000 γ 0.000

Fifth surface decentering

X 0.000 Y 0.000 Z 0.000
α −30.000 β 0.000 γ 0.000

Example 19

Figure 27:
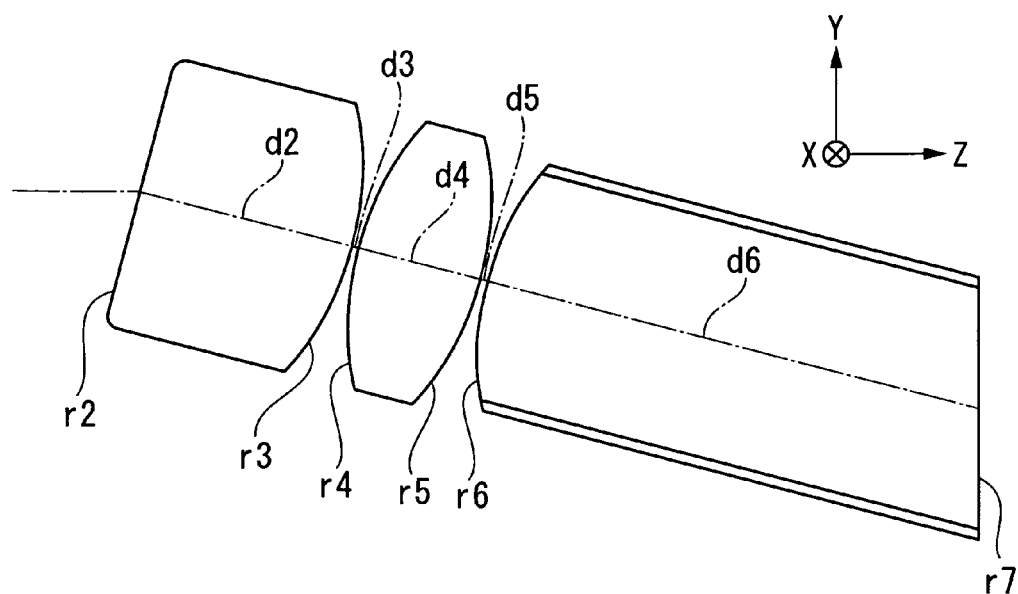
FIG. 27 is an overall configuration diagram of an illumination optical system according to Example 19 of the third embodiment of the present invention.

As shown in FIG. 27, an illumination optical system according to Example 19 is constituted of a positive lens, which is flat on an object side, a biconvex positive lens, and a rod lens in which a surface on the object side is convex toward the object side, in this order from the object side. An incident surface and an emitting surface of the rod lens are inclined and decentered. The specifications of this Example are compatible with a light source with focal length of 0.729 mm and φ 1.4 mm. Of the configuration parameters, surface number 1 is used as a reference for decentering of a second surface and surface number 6 is used as a reference for decentering of a seventh surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 1.300 | 1.8830 | 40.76 | | | |
| 3 | −2.000 | 0.040 | | | | | |
| 4 | 2.000 | 0.750 | 1.8830 | 40.76 | | | |
| 5 | −2.000 | 0.050 | | | | | |
| 6 | 2.000 | 3.000 | (rod lens) | | 1.728 | 1.516 | 0.72 |
| 7 | ∞ | 0.000 | | | | | |
| 8 | light-source end surface | | | | | | |

Second surface decentering

X 0.000 Y 0.000 Z 0.000
α 15.000 β 0.000 γ 0.000

Seventh surface decentering

X 0.000 Y 0.000 Z 0.000
α −15.000 β 0.000 γ 0.000

Example 20

Figure 28:
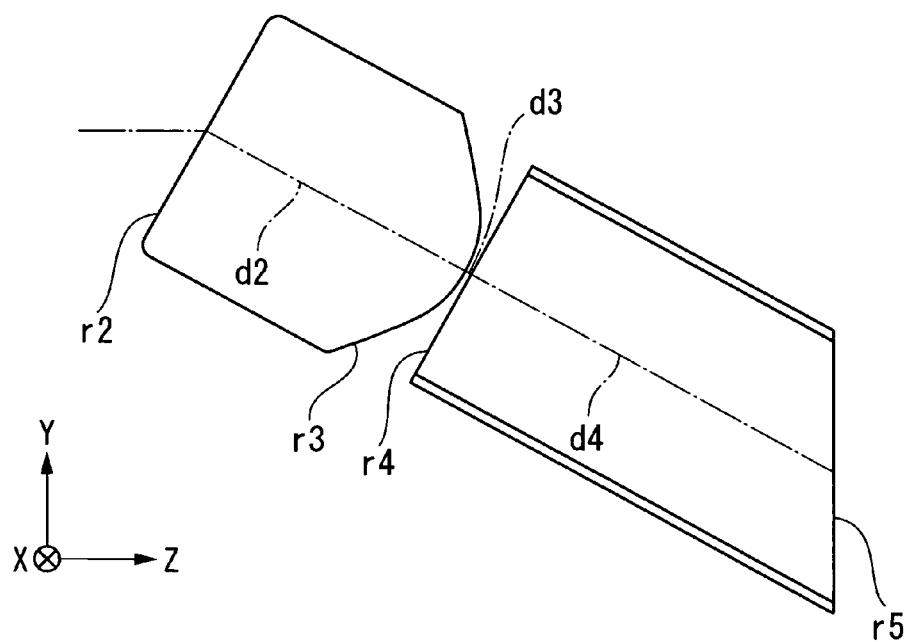
FIG. 28 is an overall configuration diagram of an illumination optical system according to Example 20 of the third embodiment of the present invention.

As shown in FIG. 28, an illumination optical system according to Example 20 is constituted of a positive lens, which is flat on an object side, and a rod lens in which both end surfaces are flat, in this order from the object side. An incident surface and an emitting surface of the rod lens are inclined and decentered. The specifications of this Example are compatible with a light source with focal length of 0.676 mm and φ 1.4 mm. Of the configuration parameters, surface number 1 is used as a reference for decentering of a second surface and surface number 4 is used as a reference for decentering of a fifth surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 1.800 | 1.8830 | 40.76 | | | |
| 3* | −0.600 | 0.040 | | | | | |
| 4 | ∞ | 2.500 | (rod lens) | | 1.728 | 1.516 | 0.72 |
| 5 | ∞ | 0.000 | | | | | |
| 6 | light-source end surface | | | | | | |

Third aspherical surface

K −1.000 A 0.200 B 0.000

Second surface decentering

X 0.000 Y 0.000 Z 0.000
α 30.000 β 0.000 γ 0.000

Fifth surface decentering

X 0.000 Y 0.000 Z 0.000
α −30.000 β 0.000 γ 0.000

Example 21

Figure 29:
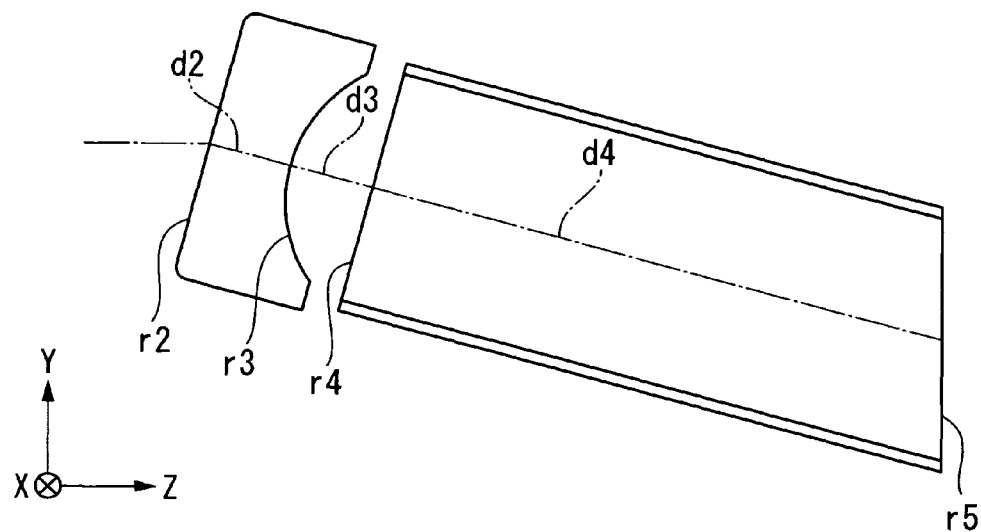
FIG. 29 is an overall configuration diagram of an illumination optical system according to Example 21 of the third embodiment of the present invention.

As shown in FIG. 29, an illumination optical system according to Example 21 is constituted of a negative lens, which is flat on an object side and a rod lens in which both end surfaces are flat, in this order from the object side. An incident surface and an emitting surface of the rod lens are inclined and decentered. The specifications of this Example are compatible with a light source with focal length of −1.169 mm and φ 1.4 mm. Of the configuration parameters, surface number 1 is used as a reference for decentering of a second surface and surface number 4 is used as a reference for decentering of a fifth surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 0.500 | 1.7682 | 71.70 | | | |
| 3 | 0.900 | 0.500 | | | | | |
| 4 | ∞ | 3.500 | (rod lens) | | 1.728 | 1.516 | 0.72 |
| 5 | ∞ | 0.000 | | | | | |
| 6 | light-source end surface | | | | | | |

Second surface decentering

X 0.000 Y 0.000 Z 0.000
α 15.000 β 0.000 γ 0.000

-continued

Fifth surface decentering

X 0.000 Y 0.000 Z 0.000
α −15.000 β 0.000 γ 0.000

Example 22

Figure 30:
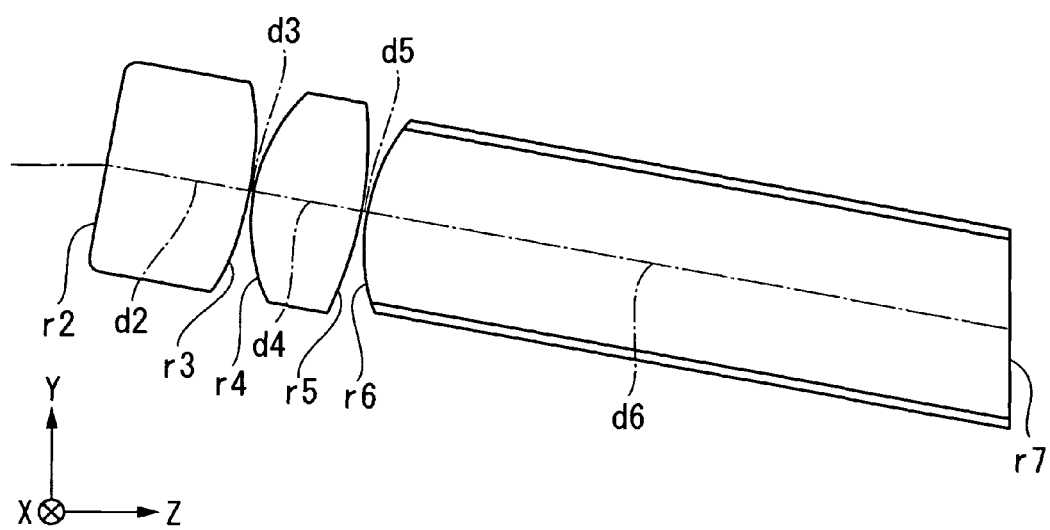
FIG. 30 is an overall configuration diagram of an illumination optical system according to Example 22 of the third embodiment of the present invention.

As shown in FIG. 30, an illumination optical system according to Example 22 is constituted of a positive lens, which is flat on an object side, a biconvex positive lens, and a rod lens in which a surface on the object side is convex toward the object side, in this order from the object side. An incident surface and an emitting surface of the rod lens are inclined and decentered. The specifications of this Example are compatible with a light source with focal length of 0.784 mm and φ 1.4 mm. Of the configuration parameters, surface number 1 is used as a reference for decentering of a second surface and surface number 6 is used as a reference for decentering of a seventh surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 1.100 | 1.8830 | 40.76 | | | |
| 3 | −3.000 | 0.040 | | | | | |
| 4 | 1.500 | 0.850 | 1.8830 | 40.76 | | | |
| 5 | −3.000 | 0.050 | | | | | |
| 6 | 1.800 | 5.000 | (rod lens) | | 1.728 | 1.516 | 0.72 |
| 7 | ∞ | 0.000 | | | | | |
| 8 | light-source end surface | | | | | | |

Second surface decentering

X 0.000 Y 0.000 Z 0.000
α 10.000 β 0.000 γ 0.000
Seventh surface decentering

X 0.000 Y 0.000 Z 0.000
α −10.000 β 0.000 γ 0.000

Example 23

Figure 31:
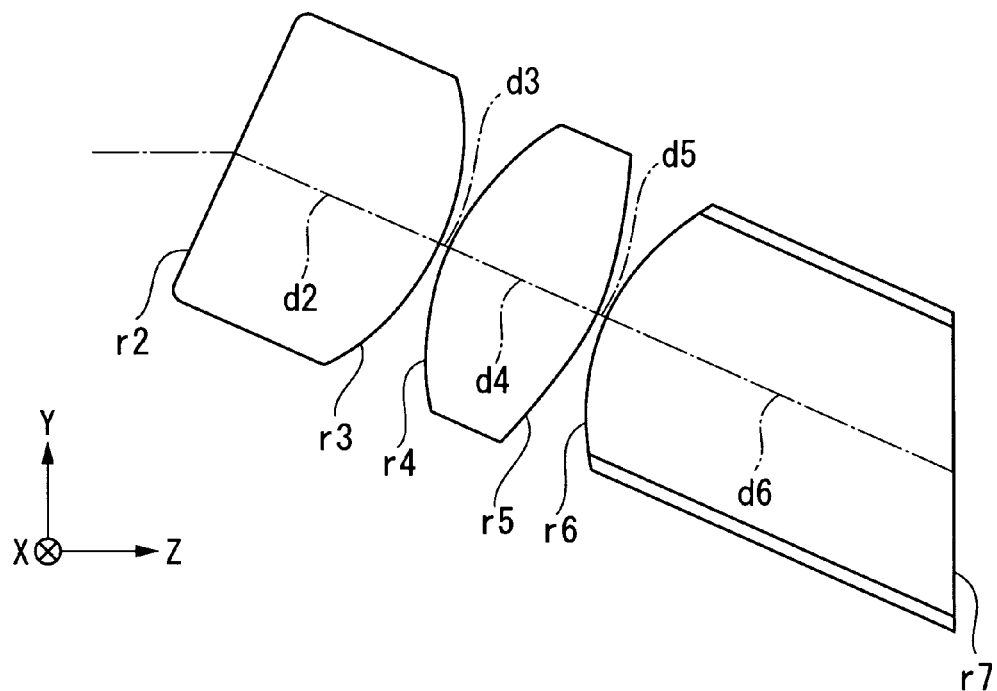
FIG. 31 is an overall configuration diagram of an illumination optical system according to Example 23 of the third embodiment of the present invention.

As shown in FIG. 31, an illumination optical system according to Example 23 is constituted of a positive lens, which is flat on an object side, a biconvex positive lens, and a rod lens in which a surface on the object side is convex toward the object side, in this order from the object side. An incident surface and an emitting surface of the rod lens are inclined and decentered. The specifications of this Example are compatible with a light source with focal length of 0.788 mm and φ 1.4 mm. Of the configuration parameters, surface number 1 is used as a reference for decentering of a second surface and surface number 4 is used as a reference for decentering of a fifth surface to express the amounts of decentering.

| Surface data | | | | | | | |
|---|---|---|---|---|---|---|---|
| Surface number | r | d | nd | vd | nd_core | nd_clad | core φ |
| 1 | ∞ | 0.000 | | | | | |
| 2 | ∞ | 1.200 | 1.8830 | 40.76 | | | |
| 3 | −1.500 | 0.040 | | | | | |
| 4 | 1.600 | 0.850 | 1.8830 | 40.76 | | | |
| 5 | −2.000 | 0.050 | | | | | |
| 6 | 1.350 | 2.000 | (rod lens) | | 1.728 | 1.516 | 0.72 |
| 7 | ∞ | 0.000 | | | | | |
| 8 | light-source end surface | | | | | | |

Second surface decentering

X 0.000 Y 0.000 Z 0.000
α 25.000 β 0.000 γ 0.000
Seventh surface decentering

X 0.000 Y 0.000 Z 0.000
α −25.000 β 0.000 γ 0.000

The specifications of the illumination optical systems according to Examples 17 to 23, configured as above, are shown in Table 3. Here, θr is an angle formed between normals of the two end surfaces of the rod lens, θLG is an angle formed between the center axis of the light guide and the distal end surface thereof, L is a length of the rod lens at a center thereof, Dr is the diameter of the rod lens at the light-source-side end surface, Din is the diameter of the rod lens at the light-source-side end surface, R1 is the radius of curvature of the positive lens disposed on the object side of the rod lens, R2 is the radius of curvature of the negative lens disposed at the object side of the rod lens, R3 is the radius of curvature of a surface whose curvature is the largest among the surfaces of the two positive lenses disposed at the object side of the rod lens, L1 is the optical axis distance from the light-source-side end surface of the rod lens to the incident surface of the negative lens.

TABLE 3

| | Example | | | | | | |
|---|---|---|---|---|---|---|---|
| | 17 | 18 | 19 | 20 | 21 | 22 | 23 |
| θr, θLG | 20 | 30 | 15 | 30 | 15 | 10 | 25 |
| L/Dr | 2.86 | 1.43 | 2.14 | 1.79 | 2.50 | 3.57 | 1.43 |
| Din/R1 | 2.00 | — | — | 2.00 | — | — | — |
| Din/R2 | — | 2.00 | — | — | 1.56 | — | — |
| Din/R3 | — | — | 2.14 | — | — | 3.57 | 1.43 |
| L1/Din | 4.10 | 2.07 | 3.67 | 3.10 | 3.21 | 5.03 | 2.96 |

Figure 32:
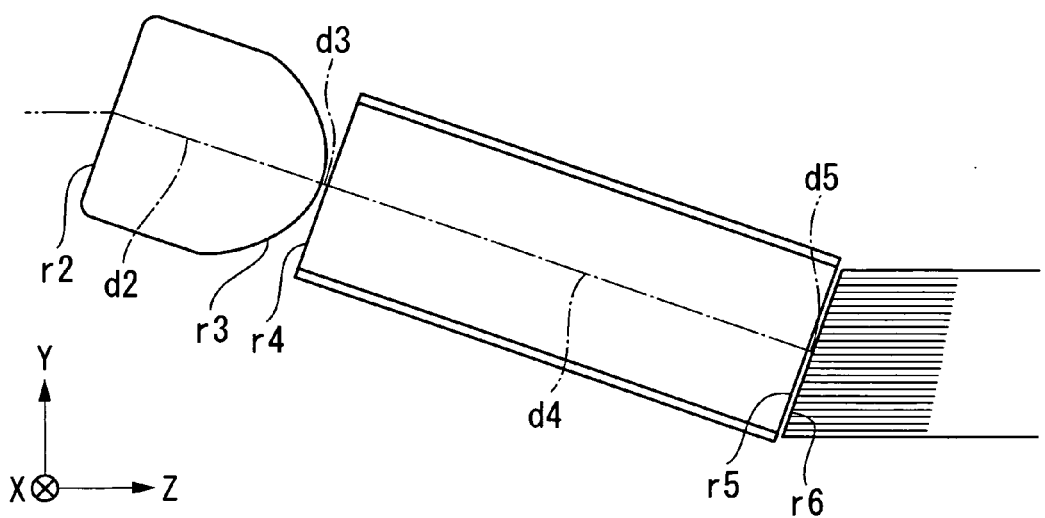
FIG. 32 is a diagram showing a modification of the illumination optical system in FIG. 25.

Although one end surface of the rod lens is inclined in Examples 17 to 23, the distal end surface of the light guide may be inclined instead of the end surface of the rod lens, so long as it possesses the optical properties described in the individual lens data. As an example, FIG. 32 shows a case in which an inclination is formed at the distal end surface of the light guide in the illumination optical system according to Example 17.

(Additional Items)

Inventions with following configurations are derived from these Examples.

(Additional Item 1)

An illumination optical system including a prism that is disposed on an incident optical axis of a light source and at least one lens that is disposed at a stage before or a stage after the prism, wherein the prism has two reflection surfaces, and at least one of the reflection surfaces is a transmission/reflection surface that serves for both reflection and transmission.

(Additional Item 2)

An illumination optical system according to Additional Item 1, wherein the prism and at least one lens are disposed in this order from the light source side; in the prism, a beam from the light source passes through a transmission surface, the transmission/reflection surface, the reflection surface, and the transmission/reflection surface, in this order.

(Additional Item 3)

An illumination optical system according to Additional Item 1, wherein the lens is a positive lens and is disposed at the stage before the prism.

(Additional Item 4)

An illumination optical system according to Additional Item 1, wherein an angle formed between the normal of the reflection surface of the prism and the normal of the transmission/reflection surface thereof satisfies the following conditional expression:

$$20°≦θ≦45°.$$

(Additional Item 5)

An illumination optical system according to Additional Item 4, wherein the normal of the reflection surface of the prism and the normal of the transmission/reflection surface thereof satisfies the following conditional expression:

$$10°≦θ≦30°.$$

(Additional Item 6)

An illumination optical system according to Additional Item 1, wherein the prism has a refractive index that satisfies the following conditional expression:

$$1.6≦n≦2.2$$

where n is the refractive index of a prism with respect to the d-line.

(Additional Item 7)

An illumination optical system according to Additional Item 6, wherein the prism has a refractive index that satisfies the following conditional expression:

$$1.65≦n≦2.0.$$

(Additional Item 8)

An illumination optical system according to Additional Item 1, wherein part of the light passes through the prism in a direction that intersects with the incident optical axis at the transmission/reflection surface.

(Additional Item 9)

An illumination optical system according to Additional Item 1, wherein the prism is provided in plurality, and the individual prisms are disposed so that the transmission/reflection surfaces thereof face different directions.

(Additional Item 10)

An illumination optical system according to Additional Item 1, wherein the lens has a positive focal length, is disposed at a stage after the prism, and a shape factor SF1 thereof satisfies the following conditional expression:

$$0.5≦SF1≦1.25$$

where SF1 is (R1+R2)/(R1−R2) where R1 is the radius of curvature of the object side surface of the lens and R2 is the radius of curvature of the light-source side surface of the lens.

(Additional Item 11)

An illumination optical system according to Additional Item 10, wherein the shape factor SF1 of the lens satisfies the following conditional expression:

$$0.8≦SF1≦1.05.$$

(Additional Item 12)

An illumination optical system according to Additional Item 1, wherein the lens has a negative focal length, is disposed at a stage after the prism, and a shape factor SF2 thereof satisfies the following conditional expression:

$$0.6≦SF2≦1.25$$

where SF2 is (R1+R2)/(R1−R2) where R1 is the radius of curvature of the object side surface of the lens and R2 is the radius of curvature of the light-source side surface of the negative lens.

(Additional Item 13)

An illumination optical system according to Additional Item 12, wherein the shape factor SF2 of the lens satisfies the following conditional expression:

$$0.7≦SF2≦1.05.$$

(Additional Item 14)

An illumination optical system according to Additional Item 3, wherein a shape factor SF3 of the lens satisfies the following conditional expression:

$$-1.2≦SF3≦0.2$$

where SF3 is (R1+R2)/R1−R2) where R1 is the radius of curvature of the object side surface of the lens, and R2 is the radius of curvature of the light-source side surface of the lens.

(Additional Item 15)

An illumination optical system according to Additional Item 3, wherein a shape factor SF3 of the lens satisfies the following conditional expression:

$$-1.05≦SF3≦0.$$

(Additional Item 16)

An illumination optical system according to Additional Item 1, wherein the prism has a reflection effects at a side surface thereof.

(Additional Item 17)

An illumination optical system according to Additional Item 16, wherein a mirror coating is applied to the side surface of the prism.

(Additional Item 18)

An illumination optical system according to Additional Item 1, wherein the prism has a diffusing effect at the side surface of the prism.

(Additional Item 19)

An illumination optical system according to Additional Item 1 provided with a member that is disposed on the object side of the prism and that has a diffusing effect.

(Additional Item 20)

An illumination optical system according to Additional Item 1, wherein the transmission/reflection surface has a reflection effect at a portion thereof.

(Additional Item 21)

An illumination optical system provided with a prism that is disposed so as to intersect with the incident optical axis of the light source at an angle, that transmits and emits part of light that has entered along the incident optical axis, and that has a surface that emits at least part of the rest of the light by deflecting it in a direction that intersects with the incident optical axis.

(Additional Item 22)

An illumination optical system according to Additional Item 21, wherein the prism has a substantially columnar shape whose center axis is disposed along the direction of the incident optical axis, and an end surface thereof disposed at the opposite side from the light source is formed at an angle with respect to the center axis.

(Additional Item 23)

An illumination optical system according to Additional Item 21 includes, at a stage before the prism, a frustum-like tapered rod prism that is disposed along the incident optical axis.

(Additional Item 24)

An illumination optical system according to Additional Item 21, wherein the prism has a refractive index that satisfies the following conditional-expression:

$$1.6 \leq np \leq 2.2$$

where np is the refractive index of a prism.

(Additional Item 25)

An illumination optical system according to Additional Item 24, wherein the prism has a refractive index that satisfies the following conditional expression:

$$1.7 \leq np \leq 2.0.$$

(Additional Item 26)

An illumination optical system according to Additional Item 21, wherein an angle formed between the center axis of the prism and the reflection surface thereof satisfies the following conditional expression:

$$20° \leq \theta p \leq 70°$$

where θp is an angle formed between a center axis and a reflection surface of a prism.

(Additional Item 27)

An illumination optical system according to Additional Item 26, wherein an angle formed between the center axis of the prism and the reflection surface thereof satisfies the following conditional expression:

$$35° \leq \theta p \leq 60°.$$

(Additional Item 28)

An illumination optical system according to Additional Item 23, wherein the tapered rod prism has a refractive index that satisfies the following conditional expression:

$$1.4 \leq nt \leq 1.8$$

where nt is the refractive index of a tapered rod prism.

(Additional Item 29)

An illumination optical system according to Additional Item 28, wherein the tapered rod prism has a refractive index that satisfies the following conditional expression:

$$1.45 \leq nt \leq 1.7.$$

(Additional Item 30)

An illumination optical system according to Additional Item 23, wherein the tapered rod prism has a length that satisfies the following conditional expression:

$$1.0 \leq Din/Lt \leq 6.0$$

where Lt is the length of a center axis of the tapered rod prism, and Din is diameter or diagonal length of the tapered rod prism at the larger of the two end surfaces.

(Additional Item 31)

An illumination optical system according to Additional Item 30, wherein the tapered rod prism has a length that satisfies the following conditional expression:

$$1.2 \leq Din/Lt \leq 4.5.$$

(Additional Item 32)

An illumination optical system according to Additional Item 23, wherein the tapered rod prism is disposed so as to gradually become smaller in the emitting direction with respect to the incident surface and satisfies the following conditional expression:

$$0.025 \leq Sout/Sin \leq 1.0$$

where Sin is the area of an incident surface of a tapered rod prism, and Sout is the area of an emitting surface of the tapered rod prism.

(Additional Item 33)

An illumination optical system according to Additional Item 32, wherein the tapered rod prism satisfies the following conditional expression:

$$0.1 \leq Sout/Sin \leq 0.65.$$

(Additional Item 34)

An illumination optical system according to Additional Item 23, wherein the tapered rod prism is disposed so as to gradually become larger in the emitting direction with respect to the incident surface, and satisfies the following conditional expression:

$$0.025 \leq Sin/Sout \leq 1.0$$

where Sin is the area of an incident surface of a tapered rod prism, and Sout is the area of an emitting surface of the tapered rod prism.

(Additional Item 35)

An illumination optical system according to Additional Item 34, wherein the tapered rod prism satisfies the following conditional expression:

$$0.05 \leq Sin/Sout \leq 0.7.$$

(Additional Item 36)

An illumination optical system according to Additional Item 22, wherein the prism has a flat surface in a portion of a side surface.

(Additional Item 37)

An illumination optical system according to Additional Item 22, wherein a curvature of a portion of a side surface in the prism differs from other portions thereof.

(Additional Item 38)

An illumination optical system according to Additional Item 23, wherein the two end surfaces of the tapered rod prism have different shapes.

(Additional Item 39)

An illumination optical system provided with a rod lens whose longitudinal direction is arranged at an angle with respect to the incident optical axis of the light source.

(Additional Item 40)

An illumination optical system according to Additional Item 39, wherein the light-source-side end surface of the rod lens is formed at an angle with respect to the longitudinal direction thereof.

(Additional Item 41)

An illumination optical system according to Additional Item 39 provided with a light guide that is disposed between the light source and the rod lens and that guides light from the light source to the rod lens, wherein the light guide has a distal end surface that is formed at an angle with respect to the optical axis thereof.

(Additional Item 42)

An illumination optical system according to Additional Item 40, wherein an angle formed between the normal of the light-source end surface of the rod lens and the normal of the other end surface thereof satisfies the following conditional expression:

$$3° \leq \theta r \leq 40°$$

where θr is an angle formed between the normal of the light-source-side end surface and the normal of the other end surface.

(Additional Item 43)

An illumination optical system according to Additional Item 42, wherein an angle formed between the normal of the light-source-side end surface of the rod lens and the normal of the other end surface thereof satisfies the following conditional expression:

$$5° \leq \theta r \leq 30°.$$

(Additional Item 44)

An illumination optical system according to Additional Item 40, wherein the rod lens has a length that satisfies the following conditional expression:

$$1.0 \leq L/Dr \leq 5.0$$

where L is the length of a rod lens at the center thereof, and Dr is the diameter of the rod lens at an end surface on the light source side.

(Additional Item 45)

An illumination optical system according to Additional Item 44, wherein the rod lens has a length that satisfies the following conditional expression:

$$1.2 \leq L/Dr \leq 4.0$$

where L is the length of a rod lens at a center thereof, and Dr is the diameter of the rod lens at an end surface on the light source side.

(Additional Item 46)

An illumination optical system according to Additional Item 41, wherein an angle formed between a center axis of the light guide and the distal end surface thereof satisfies the following conditional expression:

$$3° \leq \theta LG \leq 30°$$

where θLG is an angle formed between a center axis of a light guide and a distal end thereof.

(Additional Item 47)

An illumination optical system according to Additional Item 46, wherein an angle formed between a center axis of the light guide and the distal end surface thereof satisfies the following conditional expression:

$$5° \leq \theta LG \leq 20°.$$

(Additional Item 48)

An illumination optical system according to Additional item 41, wherein the rod lens has a length that satisfies the following conditional expression:

$$1.0 \leq L/Dr \leq 5.0$$

where L is the length of a center axis of a rod lens, and DLG is the diameter of the distal end surface on a light guide.

(Additional Item 49)

An illumination optical system according to Additional item 48, wherein the rod lens has a length that satisfies the following conditional expression:

(Additional Item 50)

An illumination optical system according to Additional Item 39 that is provided with a positive lens disposed at a stage after the rod lens and that satisfies the following conditional expression:

$$0.35 \leq Din/R1 \leq 1.2$$

where Din is the diameter of a light-source-side end surface of a rod lens, and R1 is the radius of curvature of a positive lens at a light-source side surface.

(Additional Item 51)

An illumination optical system according to Additional Item 50 that satisfies the following conditional expression:

$$0.5 \leq Din/R1 \leq 0.9.$$

(Additional Item 52)

An illumination optical system according to Additional Item 39 that is provided with a positive lens disposed at a stage after the rod lens, and that satisfies the following conditional expression:

$$1.5 \leq Ll/Din \leq 5.0$$

where Ll is the optical axis distance from a light-source-side end surface of a rod lens to an emitting surface of a positive lens, and Din is the diameter of the rod lens at the light-source-side end surface.

(Additional Item 53)

An illumination optical system according to Additional Item 52 that satisfies the following conditional expression:

$$2.5 \leq Ll/Din \leq 4.5$$

where Ll is the optical axis distance from a light-source-side end surface of a rod lens to an emitting surface of a positive lens, and Din is the diameter of the rod lens at the light-source-side end surface.

(Additional Item 54)

An illumination optical system according to Additional Item 39 that is provided with a negative lens disposed at a stage after the rod lens, and that satisfies the following conditional expression:

$$0.3 \leq Din/R2 \leq 1.5$$

where Din is the diameter of a rod lens at a light-source-side end surface, and R2 is the radius of curvature of a negative lens at a light-source side surface thereof.

(Additional Item 55)

An illumination optical system according to Additional Item 54 that satisfies the following conditional expression:

$$0.5 \leq Din/R2 \leq 1.2.$$

(Additional Item 56)

An illumination optical system according to Additional Item 39 that is provided with a negative lens disposed at a stage after the rod lens, and that satisfies the following conditional expression:

$$1.2 \leq Ll/Din \leq 5.0$$

where Ll is the optical axis distance from a light-source-side end surface of a rod lens to an emitting surface of a negative lens, and Din is the diameter of the rod lens at the light-source-side end surface.

(Additional Item 57)

An illumination optical system according to Additional Item 56 that is provided with a negative lens disposed at a stage after the rod lens, and that satisfies the following conditional expression:

$$1.5 \leq Ll/Din \leq 3.5.$$

(Additional Item 58)

An illumination optical system according to Additional Item 39 that is provided with two positive lenses disposed at a stage after the rod lens, and that satisfies the following conditional expression:

$$0.3 \leq Din/R3 \leq 1.5$$

where Din is the diameter of a rod lens at a light-source-side end surface, and R3 is the radius of curvature of a surface having the largest curvature among surfaces in the two positive lenses.

(Additional Item 59)

An illumination optical system according to Additional Item 58 that satisfies the following conditional expression:

$$0.5 \leq Din/R3 \leq 1.2.$$

(Additional Item 60)

An illumination optical system according to Additional Item 39 that is provided with two positive lenses disposed at a stage after the rod lens, and that satisfies the following conditional expression:

$$1.5 \leq Ll/Din \leq 7.0$$

where Ll is the optical axis distance from a light-source-side end surface of a rod lens to an emitting surface of a positive lens, and Din is the diameter of the rod lens at the light-source-side end surface.

(Additional Item 61)

An illumination optical system according to Additional Item 60 that satisfies the following conditional expression:

$$2 \leq Ll/Din \leq 5.5.$$

REFERENCE SIGNS LIST

1 illumination optical system
2 prism
2a incident surface (transmission surface)
2b transmission/reflection surface
2c reflection surface
3 lens
3a light-source side surface
3b object side surface
4 prism
4a incident surface
4b inclined surface (surface)
4c side surface
5 tapered rod prism
6 rod lens
6a incident surface
6b emitting surface
7 lens
8 light guide

The invention claimed is:

1. An illumination optical system comprising:
   a prism that is disposed on an incident optical axis of light from a light source; and
   a lens that is disposed between the light source and an incident surface of the prism or between an emitting surface of the prism and an illuminated object,
   wherein the prism has two reflection surfaces, and at least one of the reflection surfaces is a transmission/reflection surface that serves for reflection and transmission,
   wherein a refractive index n of the prism with respect to a d-line satisfies $1.6 \leq n \leq 2.2$,
   wherein the prism and the lens are arranged in this order from the light source side,
   wherein a beam from the light source passes through the prism via a transmission surface, the transmission/reflection surface, the reflection surface, and the transmission/reflection surface, in this order, and
   wherein, when the lens is a positive lens, a shape factor SF1 of the lens satisfies $0.5 \leq SF1 \leq 1.25$, and when the lens is a negative lens, a shape factor SF2 of the lens satisfies $0.6 \leq SF2 \leq 1.25$, where SF1 and SF2 are defined by (R1+R2)/(R1−R2), R1 is a radius of curvature of an object side surface of the lens, and R2 is a radius of curvature of a light-source side surface of the lens.

2. An illumination optical system according to claim 1, further comprising a positive lens that is disposed between the light source and an incident surface of the prism,
   wherein a shape factor SF3 of the lens satisfies $-1.2 \leq SF \leq 30.2$, where SF3 is expressed as SF3=(R1+R2)/(R1−R2), R1 is a radius of curvature of an object side surface of the lens, and R2 is a radius of curvature of a light-source side surface of the lens.

3. An illumination optical system comprising:
   a prism that is disposed on an incident optical axis of light from a light source; and
   a lens that is disposed between the light source and an incident surface of the prism or between an emitting surface of the prism and an illuminated object,
   wherein the prism has two reflection surfaces, and at least one of the reflection surfaces is a transmission/reflection surface that serves for reflection and transmission,
   wherein a refractive index n of the prism with respect to a d-line satisfies $1.6 \leq n \leq 2.2$,
   wherein the lens is a positive lens and is disposed between the light source and the incident surface of the prism, and
   wherein a shape factor SF3 of the lens satisfies $-1.2 < SF3 < 0.2$, where SF3 is defined by (R1+R2)/(R1−R2), R1 is a radius of curvature of an object side surface of the lens, and R2 is a radius of curvature of a light-source side surface of the lens.

* * * * *